(12) United States Patent
Drake et al.

(10) Patent No.: US 9,109,075 B2
(45) Date of Patent: Aug. 18, 2015

(54) CROSS-LINKED ORGANIC POLYMERS FOR USE AS ELASTOMERS IN HIGH TEMPERATURE APPLICATIONS

(71) Applicant: Delsper LP, Kulpsville, PA (US)

(72) Inventors: Kerry A. Drake, Red Hill, PA (US); Le Song, Chalfont, PA (US); William F. Burgoyne, Jr., Bethlehem, PA (US)

(73) Assignee: Delsper LP, Kulpsville, PA (US)

( * ) Notice: Subject to any disclaimer, the term of this patent is extended or adjusted under 35 U.S.C. 154(b) by 0 days.

(21) Appl. No.: 14/216,659

(22) Filed: Mar. 17, 2014

(65) Prior Publication Data
US 2014/0316079 A1    Oct. 23, 2014

Related U.S. Application Data

(60) Provisional application No. 61/801,161, filed on Mar. 15, 2013.

(51) Int. Cl.
| | |
|---|---|
| C08G 65/48 | (2006.01) |
| C08G 16/00 | (2006.01) |
| C08G 8/28 | (2006.01) |
| C08G 61/12 | (2006.01) |

(52) U.S. Cl.
CPC  *C08G 8/28* (2013.01); *C08G 61/12* (2013.01); *C08G 2261/135* (2013.01); *C08G 2261/344* (2013.01)

(58) Field of Classification Search
None
See application file for complete search history.

(56) References Cited

U.S. PATENT DOCUMENTS

| | | | |
|---|---|---|---|
| 3,092,191 A | 6/1963 | Austin et al. | |
| 3,512,592 A | 5/1970 | Kellner | |
| 3,533,997 A * | 10/1970 | Angelo | 525/436 |
| 4,609,714 A | 9/1986 | Harris et al. | |
| 4,708,994 A | 11/1987 | Wong | |
| 4,710,948 A | 12/1987 | Withjack | |
| 4,731,442 A | 3/1988 | Lindley et al. | |
| 4,827,761 A | 5/1989 | Vinegar et al. | |
| 4,861,810 A | 8/1989 | Dewhirst | |

(Continued)

FOREIGN PATENT DOCUMENTS

| | | |
|---|---|---|
| EP | 251357 B1 | 1/1988 |
| GB | 2185114 | 7/1987 |

(Continued)

OTHER PUBLICATIONS

Ladacki et al, "Studies of the Variations in Bond Dissociation Energies of Aromatic Compounds. I. Mono-bromo-aryles," Proc. R. Soc. Lond. a, r219 pp. 341-253 (1953).

(Continued)

*Primary Examiner* — Robert S Loewe
(74) *Attorney, Agent, or Firm* — Flaster/Greenberg PC

(57) ABSTRACT

Methods are disclosed to prepare elastomeric materials by providing aromatic polymer(s) which is/are non-elastomeric at room temperature; cross-linking the aromatic polymer using a cross-linking compound to form a cross-linked aromatic polymer which is substantially cured; and heating the cross-linked aromatic polymer to a temperature at or above a glass transition temperature of the cross-linked aromatic polymer. Materials formed thereby and end products are also described which may be formed using the aromatic polymer cross-linking techniques to develop strong elastomeric materials for high temperature and/or harsh condition end applications.

43 Claims, 6 Drawing Sheets

(56) References Cited

U.S. PATENT DOCUMENTS

| | | | |
|---|---|---|---|
| 5,108,840 A | 4/1992 | Mercer | |
| 5,114,780 A | 5/1992 | Mercer et al. | |
| 5,134,207 A | 7/1992 | McGrath et al. | |
| 5,145,936 A | 9/1992 | Mercer | |
| 5,155,175 A * | 10/1992 | Mercer et al. | 525/390 |
| 5,173,542 A | 12/1992 | Lau et al. | |
| 5,179,188 A | 1/1993 | Mercer et al. | |
| 5,204,416 A | 4/1993 | Mercer et al. | |
| 5,235,044 A | 8/1993 | Mercer et al. | |
| 5,270,453 A | 12/1993 | Lau et al. | |
| 5,668,245 A | 9/1997 | Marrocco, III et al. | |
| 5,886,130 A | 3/1999 | Trimmer et al. | |
| 6,060,170 A | 5/2000 | Burgoyne, Jr. | |
| 6,184,284 B1 | 2/2001 | Stokich, Jr. et al. | |
| 6,339,966 B1 | 1/2002 | Kalidindi | |
| 6,582,251 B1 | 6/2003 | Burke et al. | |
| 6,716,955 B2 | 4/2004 | Burgoyne, Jr. | |
| 6,855,774 B2 | 2/2005 | Kawasaki et al. | |
| 6,878,778 B1 | 4/2005 | Kawasaki et al. | |
| 6,914,119 B2 | 7/2005 | Yoshida et al. | |
| 7,001,678 B2 | 2/2006 | Casasabta, III et al. | |
| 7,087,701 B2 | 8/2006 | Londergan | |
| 7,101,957 B2 | 9/2006 | Huang et al. | |
| 7,109,249 B2 | 9/2006 | Bruza et al. | |
| 7,115,531 B2 | 10/2006 | Shaffer, II et al. | |
| 7,189,795 B2 | 3/2007 | Burgyyne, Jr. et al. | |
| 7,196,155 B2 | 3/2007 | Chen et al. | |
| 7,249,971 B2 | 7/2007 | Burke et al. | |
| 7,307,137 B2 | 12/2007 | Lau et al. | |
| 7,589,228 B2 | 9/2009 | Nishichi et al. | |
| 7,696,275 B2 | 4/2010 | Slay et al. | |
| 7,919,825 B2 | 4/2011 | Kretz et al. | |
| 8,096,353 B2 | 1/2012 | Ver Meer | |
| 8,367,776 B2 | 2/2013 | Noguchi et al. | |
| 8,502,401 B2 | 8/2013 | Burgoyne, Jr. et al. | |
| 2002/0195739 A1 | 12/2002 | Bagley et al. | |
| 2003/0032339 A1 | 2/2003 | Bell et al. | |
| 2005/0141212 A1 | 6/2005 | Moon et al. | |
| 2006/0199910 A1 | 9/2006 | Walton et al. | |
| 2007/0142547 A1 | 6/2007 | Vaidya et al. | |
| 2007/0296101 A1 | 12/2007 | DiPietro et al. | |
| 2010/0022718 A1 * | 1/2010 | Tu et al. | 525/471 |
| 2010/0081007 A1 | 4/2010 | Zheng et al. | |
| 2010/0126266 A1 | 5/2010 | Coenen | |
| 2011/0134666 A1 | 6/2011 | Hiller et al. | |
| 2011/0260343 A1 | 10/2011 | Burgoyne, Jr. et al. | |
| 2012/0077935 A1 | 3/2012 | Gurevich et al. | |
| 2012/0097194 A1 | 4/2012 | McDaniel et al. | |
| 2012/0100379 A1 | 4/2012 | Luo et al. | |
| 2012/0130041 A1 * | 5/2012 | Han et al. | 528/125 |
| 2012/0252218 A1 | 10/2012 | Kori et al. | |
| 2013/0012635 A1 | 1/2013 | Ren et al. | |
| 2013/0130529 A1 * | 5/2013 | Ayers | 439/271 |
| 2014/0213742 A1 | 7/2014 | Drake et al. | |
| 2014/0316079 A1 | 10/2014 | Drake et al. | |

FOREIGN PATENT DOCUMENTS

| | | |
|---|---|---|
| WO | WO 0061667 A1 | 10/2000 |
| WO | WO 01/16232 A1 | 3/2001 |
| WO | WO 2009021999 A1 | 2/2009 |
| WO | WO 2010/019488 A1 | 2/2010 |
| WO | WO 2011071619 A2 | 6/2011 |
| WO | WO 2013074120 A1 | 5/2013 |

OTHER PUBLICATIONS

C.-M. Chan et al., "Crosslinking of Poly( arylene ether ketones). II. Crystallization Kinetics," J. of Polymer Science: Part B: Polymer Physics, vol. 25, pp. 1655-1665 (1987).

Hendrick, "Elastomeric behavior of Crosslinked poly(aryl ether ketone)s at elevated temperatures," Polymer, vol. 22, No. 23, pp. 5094-5097, (1992). Butterworth-Heinimann Ltd.

Yi-Chi Chien et al, "Fate of Bromine in Pyrolysis of Printed Circuit Board Wastes," ChemoSphere, vol. 40, pp. 383-387 (2000).

Burke et al., "High Pressure/High Temperature Technology and Intrduction of LHT a New High Temperature Plastic," MERL, 26 pages (Sep. 2010).

Drake, "High Temperature Hybrid Elastomers," PhD Thesis, (2011).

International Search Report and Written Opinion for PCT/US13/65977, mailed Apr. 17, 2014—15 pages.

International Search Report and Written Opinion for PCT/US14/13246, mailed Apr. 30, 2014—16 pages.

International Search Report and Written Opinion for PCT/US14/30666, mailed Aug. 13, 2014—19 pages.

Written Opinion for PCT/US14/30666, mailed Jan. 30, 2015—3 pages.

* cited by examiner

CROSS-LINKED ORGANIC POLYMERS FOR USE AS ELASTOMERS IN HIGH TEMPERATURE APPLICATIONS

CROSS-REFERENCE TO RELATED APPLICATION

This application claims the benefit under 35 U.S.C. §119(e) of U.S. Provisional Patent Application No. 61/801,161, filed Mar. 15, 2013 the disclosure of which is incorporated herein by reference in its entirety.

BACKGROUND OF THE INVENTION

1. Field of the Invention

The invention relates to the field of high temperature elastomeric materials, specifically, the use of a class of cross-linked organic polymer materials in high temperature end applications as elastomers where traditional and/or high purity elastomers lose performance due to polymer degradation.

2. Description of Related Art

Fluorine-containing elastomers, particularly perfluoroelastomers (FFKM) that include tetrafluoroethylene (TFE) and other fluorinated monomer units are known and employed in end applications where materials are required that exhibit excellent chemical resistance, solvent resistance and heat resistance. They are widely used for sealing and other products intended for use in harsh environments. Further, FFKMs are employed in end applications where a high degree of purity is required in addition to chemical resistance. As technology advances, the characteristics required even for such highly resistant compounds continue to be more rigorous. In the fields of aeronautics, downhole oil drilling, aerospace, semiconductor and chemical and pharmaceutical manufacturing, sealing properties and other elastomeric properties continue to demand the ability to function under ever increasing harsh chemical environments that are also subject to high temperature environments of not less than 300° C. The ability of such materials to withstand high temperature environments has become increasingly important.

While FFKMs provide excellent chemical and plasma resistance, in their unfilled state they typically have weaker mechanical properties. Thus, to achieve satisfactory compression set resistance and mechanical properties it is generally known in the art to include fillers or other reinforcing systems. It is a goal in the art to find ways to blend, modify or fill such materials to make them useful in high temperature end applications and form molded parts that are capable of withstanding deformation and that can withstand ever increasing rigorous conditions. FFKM materials are typically prepared from perfluorinated monomers, including at least one perfluorinated cure site monomer. The monomers are polymerized to form a curable perfluorinated polymer having the cure sites thereon intended for cross-linking upon reaction with a curative or curing agent. Upon curing (cross-linking), the base polymer material becomes elastomeric in nature and exhibits elastomeric characteristics.

Typical fillers used in the semiconductor and other industries to enhance mechanical properties, while trying to avoid diminishing chemical and/or plasma resistance, include carbon black, silica, alumina, TFE-based fluoroplastics, barium sulfate and other polymers and plastics. Sometimes blends of one or more FFKM curable polymers are made to achieve varying properties as well in attempts to improve such materials to meet the challenge of higher thermal, chemical and plasma resistant property requirements for various end applications without sacrificing mechanical and sealing properties.

Use of fluoropolymeric fillers in such compositions can also sometimes contribute negatively to a relatively high compression set particularly in end applications at higher temperatures (e.g., >300° C.). Moldability and bondability can also be limited due to use of such fluoropolymeric fillers.

Various polymers have also been developed with unique cure systems to provide base FFKM compounds that have improved heat characteristics. One example of this is U.S. Pat. No. 6,855,774. The cross-links formed are described as contributing to increased heat resistance. U.S. Pat. No. 6,878,778 further teaches curatives that are described as contributing to resulting end materials having excellent chemical resistance and mechanical strength as well as heat resistance at high temperatures.

Blended FFKMs have also been developed to achieve unique properties. FFKMs such as those formed from U.S. Pat. Nos. 6,855,774 and 6,878,778 and other FFKMs as well have been blended. U.S. Pat. No. 8,367,776 describes compositions of such polymers as well as with one or more additional FFKM(s), wherein two of the FFKM compounds in the composition differ in terms of their perfluoroalkyl vinyl ether (PAVE) monomer content by about 5 to about 25 mole percent. Such blends are described as providing the ability to form compositions which can function well without the use of fluoroplastic fillers and are alternatives to and in some cases improvements over such filled materials. Such blends provide crack-resistance in the presence of harsh chemicals, and good thermal and plasma resistant properties.

U.S. Patent Publication No. 2012/0077935 A1 describes a blend of two or more FFKMs, one of which is a high-TFE content curable perfluoropolymer (as in U.S. Pat. No. 8,367,776) and one of which has a fluoroplastic incorporated in the matrix of a second curable perfluoropolymer. The combined materials provide improved high temperature properties. Such materials are the state of the art in high temperature elastomers for use in demanding environments where chemical and/or plasma resistance are required.

While technology continues to strive to improve FFKM mechanical and compression set performance at high temperatures and in increasingly harsh environments, while retaining the beneficial chemical and/or plasma resistance of these materials due to their level of chemical purity and inertness, there remain performance issues which have become of increasing focus in the art as end users continue to push operating conditions for such materials. As the temperature increases, FFKMs tend to thermally degrade which limits their useful range. While additives and various blending and/or curative modifications attempt to push the useful temperature range higher, there are still use limits.

Other polymers are well known for high temperature use but are not usually employed in all harsh environments when a combination of both good mechanical and elastomeric properties are needed. For example, aromatic polymers such as polyarylenes are known for having thermally stable backbones, but are not generally suitable in end applications where elastomeric behavior is desired. Attempts in the art have been made to use cross-linking of such thermally stable polymers, that are otherwise not elastomeric at room temperature, so as to use the cross-linked materials at a service temperature above their glass transition point (Tg).

WO 2011/071619 A1 discloses use of high temperature sealing elements to avoid degradation in downhole use, which elements incorporate polyetherether ketone (PEEK) having N-Rx-N crosslinking groups linked to the PEEK backbone through C—N bonds.

Similarly, in J. L. Hendrick et al., "Elastomeric Behavior of Cross-linked Poly(aryl ether ketone)s at Elevated Temperatures," Polymer, Vol. 33, No. 23, pp. 5094-5097 (1992), PEEK is crosslinked by maleic anhydride via oligomer end groups to form a PEEK that exhibits elastomeric properties above its Tg. However, such systems have not yet achieved the high temperature properties and/or hydrolytic stability desired to make them useful as an alternative to FFKMs in high temperature end applications which require the right balance of mechanical and elastomeric properties.

U.S. Patent Publication No. 2013/0012635 A1 discloses thermoplastic materials useful as a shape memory material and articles formed from the thermoplastic materials by heating the shape memory polymer above its Tg, shaping the polymer and then fixing its shape into an article by cooling below the Tg. In use, such shaped articles are heated above their Tg and recover the first molded shape. The polymers suggested for use are those having thermal stability over 200° C. which may be cured in the presence or absence of oxygen. Crosslinkers such as sulfur, silica, quinone, peroxy compounds, metal peroxide, metal oxides and combinations of these cross-linkers can be used with the shape memory polymers for cross-linking.

Some of the prior art systems attempting such high temperature elastomeric end products by cross-linking use complex chemical synthesis to include specific functional groups on or in the polymer. This approach limits the ability to customize cross-link density as the polymer is fixed at the synthesis stage. Greater flexibility would allow for the ability to customize the end materials for different uses.

Lastly, FFKMs are not known as being very strong elastomers, and as noted above, attempts to improve strength include the use of fillers or specialty blends. However, this is tolerated due to their high chemical resistance. Filler systems used to attempt to improve mechanical strength can be a drawback due to thermal stability. However, if thermal stability could be improved and better mechanical properties achieved, a material would be available in the art to meet the ever increasing needs a high temperatures and demanding environments. More products could be designed that are now not possible due to limitations in available materials.

As such, there is a continued need in the art for improved, chemically-resistant materials, with good mechanical properties that can exhibit elastomeric behavior for use in environments that include exposure to harsh chemicals and/or extreme temperature and/or pressure conditions.

BRIEF SUMMARY OF THE INVENTION

In one embodiment herein the invention includes a method of preparing an elastomeric material. The method comprises (a) providing an aromatic polymer which is non-elastomeric at room temperature; (b) cross-linking the aromatic polymer using a cross-linking compound to form a cross-linked aromatic polymer that is substantially cured; and (c) heating the cross-linked aromatic polymer to a temperature at or above a glass transition temperature of the cross-linked aromatic polymer.

In one embodiment of the method, in step (b), the aromatic polymer is at least about 80% cured, preferably at least about 90% cured, and more preferably fully cured. The aromatic polymer used in the method may be selected from the group consisting of poly(arylene ether)s, polysulfones, polyethersulfones, polyarylene sulfides, polyimides, polyamides, polyureas, polyurethanes, polyphthalamides, polyamide-imides, poly(benzimidazole)s, polyarylates, liquid crystalline polymers (LCPs) and polyaramids. In one embodiment, the aromatic polymer is a poly(arylene ether) including polymer repeating units having the following structure:

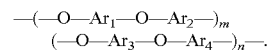

wherein $Ar^1$, $Ar^2$, $Ar^3$ and $Ar^4$ are identical or different aryl radicals, m=0 to 1.0, and n=1−m.

When the organic polymer is a poly(arylene ether), in one embodiment, m is 1 and n is 0 and the polymer has repeating units having the structure of formula (I):

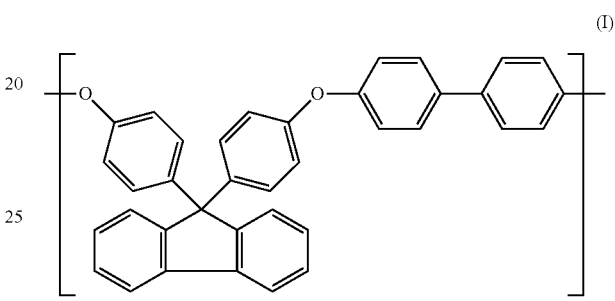

In another embodiment, the cross-linking compound has a structure according to formula (II):

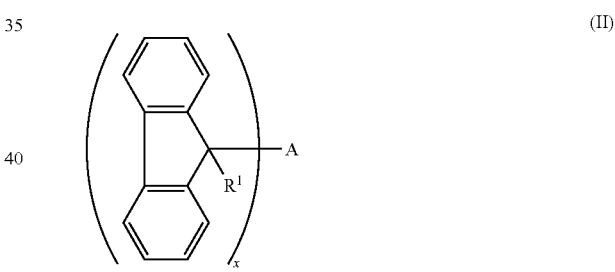

wherein A is an arene moiety having a molecular weight of less than 10,000 g/mol, $R^1$ is selected from a group consisting of hydroxide (—OH), amine (—NH$_2$), halide, ether, ester, or amide, and x is about 2.0 to about 6.0. The cross-linking compound may more preferably have a structure selected from a group consisting of

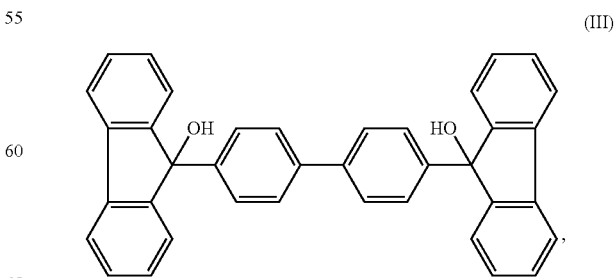

(IV)
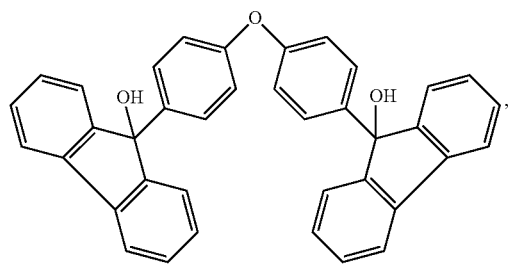

(V)
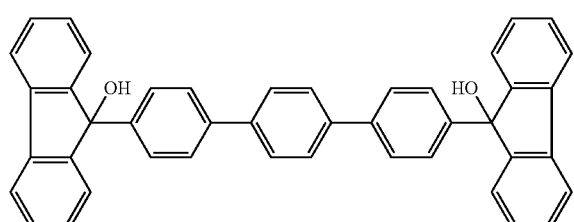

(VI)
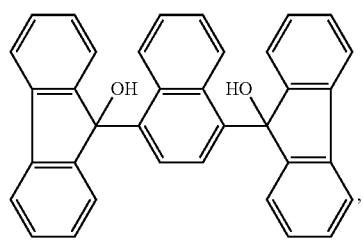

(VII)
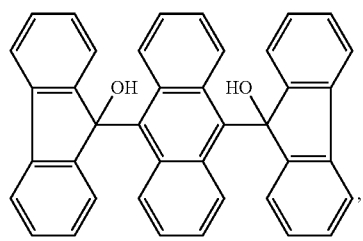

(VIII)
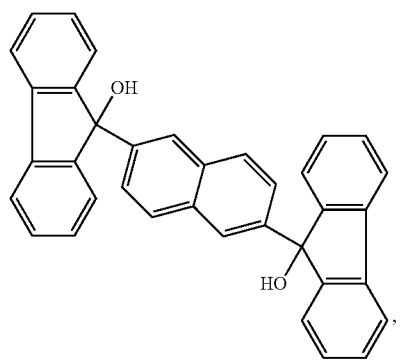

(IX)
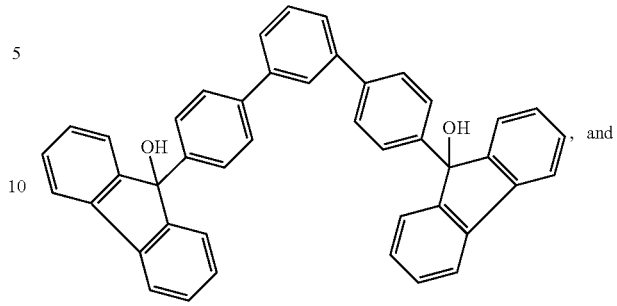, and (X)
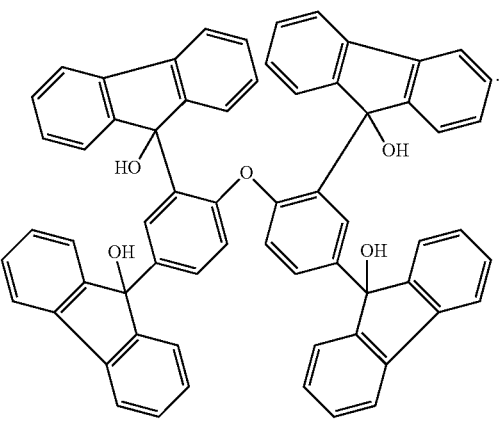

The arene moiety in the compound may have a molecular weight of about 1,000 g/mol to about 9,000 g/mol, and preferably a molecular weight of about 2,000 g/mol to about 7,000 g/mol.

In one embodiment, in step (b) the method may further comprise cross-linking the organic polymer with the cross-linking compound and a cross-linking reaction additive selected from an organic acid and/or an acetate compound, wherein the cross-linking reaction additive is capable of reacting with the cross-linking compound to form a reactive intermediate in the form of an oligomer, which reactive intermediate oligomer is capable of cross-linking the organic polymer. Such a cross-linking reaction additive may be an organic acid selected from glacial acetic acid, formic acid, and/or benzoic acid. In one embodiment, the cross-linking reaction additive is an acetate compound having a structure according to formula (XI):

(XI)
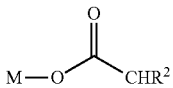

wherein M is a Group I or a Group II metal; and $R^2$ is a alkyl, aryl or aralkyl group, wherein the alkyl group comprises a hydrocarbon group of 1 to about 15 carbon atoms which has from 0 to about 5 ester or ether groups along or in a chain of the hydrocarbon group, and wherein $R^2$ comprises 0 to about 5 functional groups selected from sulfate, phosphate, hydroxyl, carbonyl, ester, halide, mercapto or potassium. The acetate compound in this embodiment is preferably selected from lithium acetate hydrate sodium acetate, and/or potassium acetate, and salts and derivatives thereof.

If a cross-linking reaction additive is used with the cross-linking compound, the weight percentage ratio of the cross-linking compound to the cross-linking reaction additive is preferably about 10:1 to about 10,000:1, and more preferably about 20:1 to about 1000:1.

The method may also further comprise forming a composition comprising the cross-linked organic polymer and heating the composition to form a molded article and step (c) further comprises placing the molded article in use at a temperature at or above the glass transition temperature of the cross-linked organic polymer.

The invention also includes an article or articles formed by the method described herein, for example, but not limited to an O-ring, a V-ring, a U-cup, a gasket, at least one component of a seal stack, a packer element, a diaphragm, a face seal, a bearing, a valve seat, an adapter, a wiper ring, a chevron seal back-up ring, an tubing.

In another embodiment herein, the invention includes an elastomeric material formed by heating a cross-linked aromatic polymer that is substantially cured at or above a glass transition temperature of the cross-linked aromatic polymer, wherein the aromatic polymer is not elastomeric at room temperature prior to cross-linking, and wherein the aromatic polymer is cross-linked by reaction with a cross-linking compound or by thermally induced cross-linking of an aromatic polymer having a graft bonded to the aromatic polymer.

The invention also includes an elastomeric article formed by heat molding a composition comprising a cross-linked aromatic polymer to form a molded article, wherein the aromatic polymer is not elastomeric at room temperature prior to cross-linking, and wherein the cross-linked aromatic polymer is substantially cured, and heating the molded article at or above a glass transition temperature of the cross-linked aromatic polymer, wherein the aromatic polymer is cross-linked by reaction with a cross-linking compound or by thermally induced cross-linking of an aromatic polymer having a graft bonded to the aromatic polymer.

In yet a further embodiment, the invention includes a composition for forming an elastomeric material, comprising an aromatic polymer that is non-elastomeric at room temperature; and a cross-linking compound, wherein the cross-linking compound and the aromatic polymer can react to form a cross-linked aromatic polymer that becomes elastomeric when heated at or above a glass transition temperature of the cross-linked aromatic polymer.

The invention also includes a method of using an organic polymer that is not elastomeric at room temperature in an elastomeric application, comprising cross-linking the organic polymer using a cross-linking compound to form a cross-linked organic polymer to substantially cure the aromatic polymer; and heating the cross-linked polymer in use at or above a glass transition temperature of the cross-linked polymer such that it becomes elastomeric. The method may further comprise forming a composition comprising the cross-linked organic polymer, molding the composition into a molded article, placing the molded article in use and heating the molded article in use so as to heat the cross-linked polymer at or above the glass transition temperature of the cross-linked polymer.

The invention further has an embodiment including a method of preparing an elastomeric material. The method comprises (a) providing an aromatic polymer which is non-elastomeric at room temperature; (b) cross-linking the aromatic polymer using a cross-linking compound to form a cross-linked aromatic polymer, wherein the cross-linking compound has a structure according to formula (II):

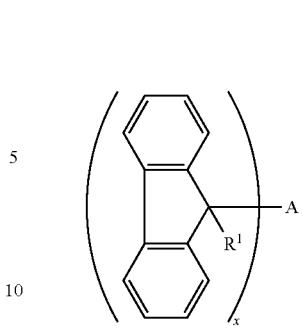

(II)

wherein A is an arene moiety having a molecular weight of less than 10,000 g/mol, $R^1$ is selected from a group consisting of hydroxide (—OH), amine (—NH$_2$), halide, ether, ester, or amide, and x is about 2.0 to about 6.0; and (c) heating the cross-linked aromatic polymer to a temperature at or above a glass transition temperature of the cross-linked aromatic polymer.

In the method, in step (b), the aromatic polymer is preferably at least about 80% cured, more preferably at least about 90% cured and most preferably, it is fully cured. The aromatic polymer in the method may be one or more of poly(arylene ether)s, polysulfones, polyethersulfones, polyarylene sulfides, polyimides, polyamides, polyureas, polyurethanes, polyphthalamides, polyamide-imides, poly(benzimidazole)s, polyarylates, liquid crystalline polymers (LCPs) and polyaramids.

In one embodiment of the method noted above, the aromatic polymer is a poly(arylene ether) including polymer repeating units having the following structure:

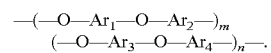

wherein $Ar^1$, $Ar^2$, $Ar^3$ and $Ar^4$ are identical or different aryl radicals, m=0 to 1.0, and n=1–m. In this method, step (b) may further comprise cross-linking the organic polymer with the cross-linking compound and a cross-linking reaction additive selected from an organic acid and/or an acetate compound, wherein the cross-linking reaction additive is capable of reacting with the cross-linking compound to form a reactive intermediate in the form of an oligomer, which reactive intermediate oligomer is capable of cross-linking the organic polymer. The cross-linking reaction additive may be an organic acid selected from glacial acetic acid, formic acid, and/or benzoic acid. The cross-linking reaction additive may be an acetate compound having a structure according to formula (XI):

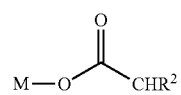

(XI)

wherein M is a Group I or a Group II metal; and $R^2$ is a alkyl, aryl or aralkyl group, wherein the alkyl group comprises a hydrocarbon group of 1 to about 15 carbon atoms which has from 0 to about 5 ester or ether groups along or in a chain of the hydrocarbon group, and wherein $R^2$ comprises 0 to about 5 functional groups selected from sulfate, phosphate, hydroxyl, carbonyl, ester, halide, mercapto or potassium. The acetate compound is selected from lithium acetate hydrate sodium acetate, and/or potassium acetate, and salts and derivatives thereof. The weight percentage ratio of the crosslinking compound to the cross-linking reaction additive, if used, is about 10:1 to about 10,000:1, preferably about 20:1 to about 1000:1.

In yet a further embodiment of the method, the organic polymer is a poly(arylene ether), m is 1 and n is 0 and the polymer has repeating units having the structure of formula (I):

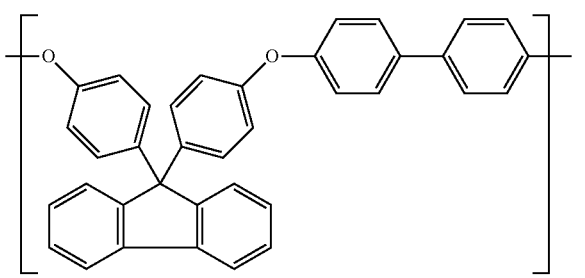

(I)

Further, the cross-linking compound may have a structure selected from a group consisting of

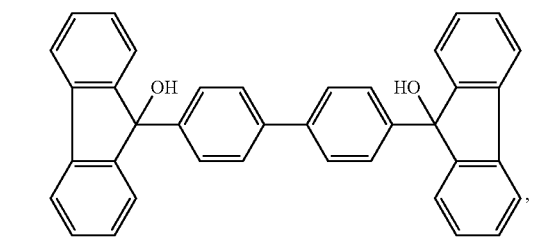

(III)

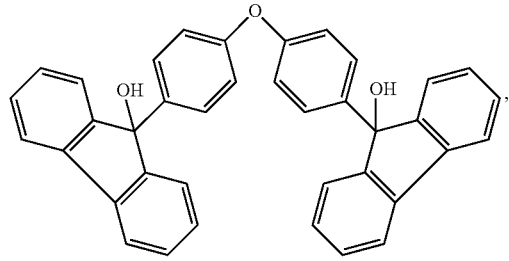

(IV)

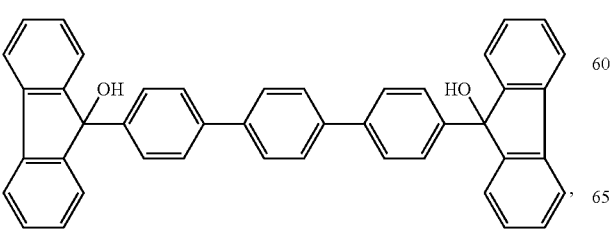

(V)

-continued

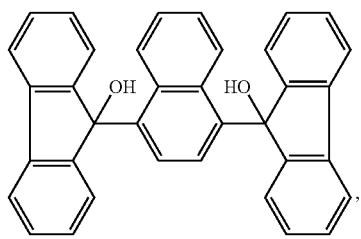

(VI)

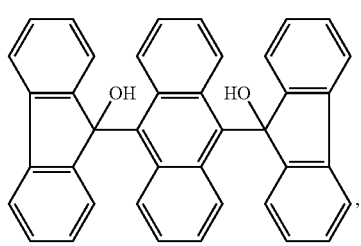

(VII)

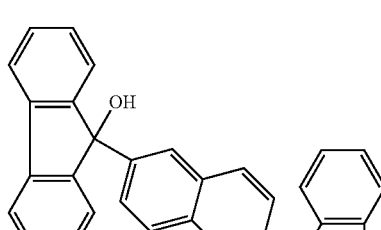

(VIII)

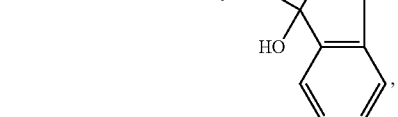

(IX)

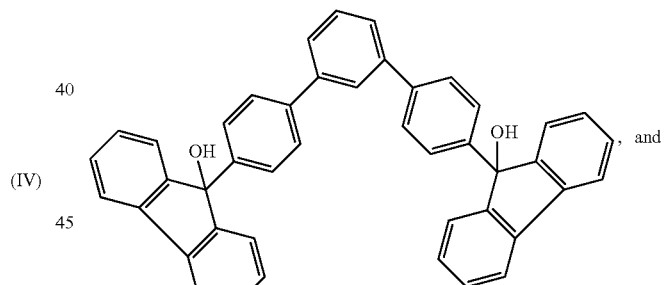

, and

(X)

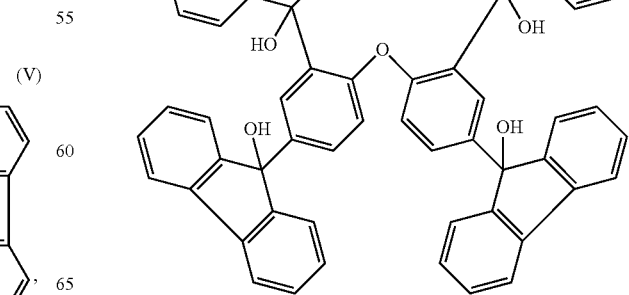

.

In the method noted above, the arene moiety may have a preferred a molecular weight of about 1,000 g/mol to about 9,000 g/mol, and more preferably about 2,000 g/mol to about 7,000 g/mol.

The method may further comprise forming a composition comprising the cross-linked organic polymer and heating the composition to form a molded article and step (c) further comprises placing the molded article in use at a temperature at or above the glass transition temperature of the cross-linked organic polymer.

The invention also includes an article or articles formed by this method which may be the same as those noted above for previous embodiments.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
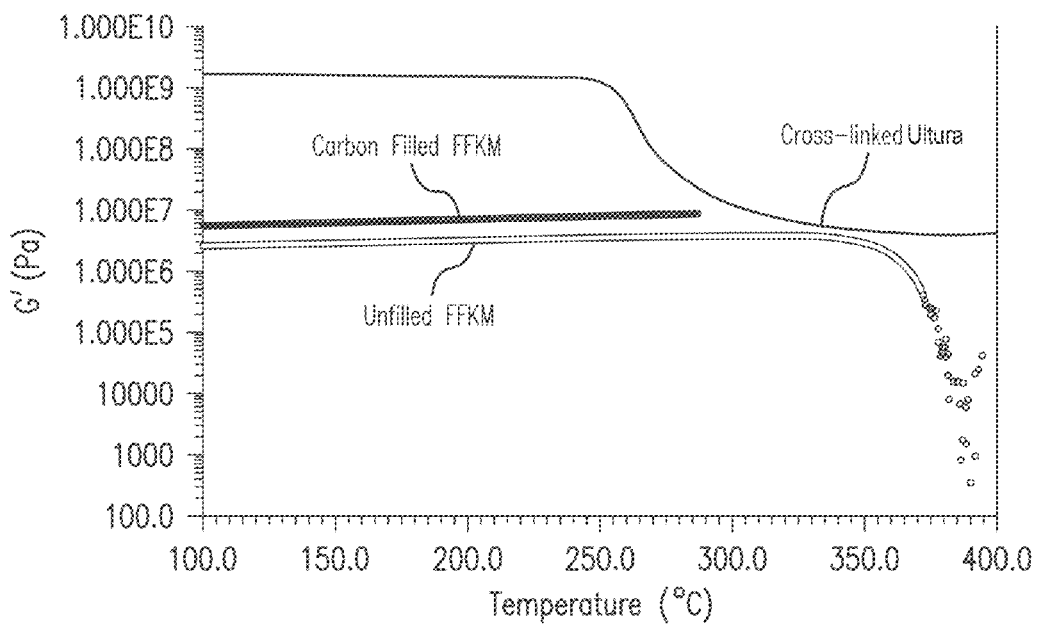
FIG. 1 is a graphical representation of the relationship of G' to temperature to show a degradation curve for cross-linked Ultura™, an FFKM and a carbon-filled FFKM referenced in Example 1 herein.

The applicants have determined that cross-linked aromatic polymers that are non-elastomeric at room temperature, and in particular, classes of cross-linked polyarylene polymers or polyphenylene sulfides, when applied in use in end applications above the glass transition temperature of the cross-linked aromatic polymer, become elastomeric in nature while maintaining excellent mechanical properties. Such materials can thus be used in harsh conditions and high-temperature applications including conditions where FFKM materials can experience degradation. Because materials used herein can be cross-linked without complex synthesis, the cross-link density can be controlled for differing end applications. The materials have high temperature stability while maintaining good mechanical properties in use. Thermal stability derives from the backbone thus providing an advantage against thermal degradation over traditional FFKMs in high temperature end applications.

As used herein, "high temperature" applications includes, but is not limited to, within the context of the organic polymer being used, end applications requiring temperatures of about 30° C. above the Tg of the organic polymer subjected to the end applications, and in preferred embodiments, using polyarylene polymers or polyether sulfones and similar high temperature polymers, and encompasses those applications at temperatures at which traditional FFKMs may experience thermal degradation, such as temperatures of about 330° C., and preferably about 340° C. or higher. "High Tg" materials include those materials having a Tg of about 150° C. or more, and "low Tg" materials include those materials having a Tg of less than about 150° C. One skilled in the art would understand, based on this disclosure, that the temperature divide between "high Tg" and "low Tg" materials may be gradual, and that materials at varying Tg levels may benefit from the invention herein.

Methods of preparing an elastomeric material are included herein. In one embodiment, in a first step, an aromatic polymer is provided which is non-elastomeric at room temperature. By "non-elastomeric" is meant a material(s) which is/are not elastomeric in behavior at room temperature or under standard conditions.

"Elastomers" or "elastomeric" as those terms are used herein refer to polymers which are amorphous above the glass transition temperature of the polymer allowing for flexibility and deformability, and which upon deformation can recover their state to a large degree. The elastomers or elastomeric materials herein are formed as cross-linked chains, wherein the cross-linkages enable the elastomer to significantly recover its original configuration when an applied stress is removed, instead of being permanently deformed.

Many elastomeric materials are evaluated not only by measuring mechanical properties, such as tensile strength, flexural strength, elongation and modulus, but also by evaluating the ability of the material to recover after deformation. One property that is evaluated in this context is compression set resistance. As used herein, "compression set" refers to the propensity of an elastomeric material to remain distorted and not return to its original shape after a deforming compressive load has been removed. The compression set value is expressed as a percentage of the original deflection that the material fails to recover. For example, a compression set value of 0% indicates that a material completely returns to its original shape after removal of a deforming compressive load. Conversely, a compression set value of 100% indicates that a material does not recover at all from an applied deforming compressive load. A compression set value of 30% signifies that 70% of the original deflection has been recovered. Higher compression set values generally indicate a potential for seal leakage and so compression set values of 30% or less are preferred in the sealing arts.

The aromatic polymers herein that are non-elastomeric at room temperature include preferably polyarylene polymers. A single organic polymer may be cross-linked or more than one type of such an organic polymer may be cross-linked at the same time, preferably by first combining the polymers and then reacting the combined polymers with a cross-linking compound or thermally inducing cross-linking in organic polymers having a graft on the polymer backbone as described further below.

The at least one organic polymer may be any one or more of a number of higher glass transition temperature organic polymers used alone or in combination, such as, but not limited to, poly(arylene ether)s, polysulfones, polyethersulfones, polyarylene sulfides, polyimides, polyamides, polyureas, polyurethanes, polyphthalamides, polyamide-imides, poly(benzimidazole)s, polyarylates, liquid crystalline polymers (LCPs) and polyaramids. Preferably before being subjected to a reaction with a cross-linking compound, the polymers are non-functionalized, i.e., they are preferably chemically inert and do not bear any functional groups that could be detrimental to their use in down-hole tool articles of manufacture or other demanding end applications.

In one preferred embodiment herein, the organic polymer is a poly(arylene ether) including polymer repeating units of the following structure:

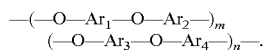

wherein $Ar^1$, $Ar^2$, $Ar^3$ and $Ar^4$ may be the same or different aryl radicals, such as those groups listed above as the arene moieties for the cross-linking compound, m=0 to 1.0, and n=1−m.

More preferably, the organic polymer is a poly(arylene ether) having a structure according to the general structure above wherein n is 0 and m is 1, with repeating units according formula (I) below and having a number average molecular weight (Mn) of preferably about 10,000 to about 30,000:

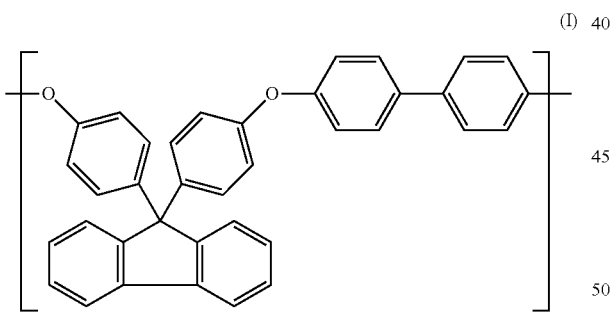

(I)

In addition, preferred polymers may be formed from thermally induced cross-linking of a polyarylene backbone having at least one graft thereon within the scope of the invention. Such materials are described in U.S. Pat. No. 6,060,170, which is incorporated herein by reference with respect to its description of the formation of such polymers and resulting end products. The organic polymer may also be cross-linked by use of a cross-linking compound either directly as in co-pending application PCT/US2011/061413 or reacting also with a cross-linking reaction additive as described further herein.

Suitable cross-linked polyarylene organic polymers for use in the invention may be obtained commercially for example, as the high temperature polymer, Ultura™ from Greene, Tweed and Co., Inc., Kulpsville, Pa.

If a cross-linking compound is used, in certain embodiments herein, the cross-linking compounds that may be used can be only a single compound or a combination of two or more such cross-linking compounds. Thus, the invention is not limited to only a single cross-linking compound. Such cross-linking compounds may be combined with an aromatic polymer to form a cross-linking composition herein, wherein the organic polymers may be any of the organic polymers noted above. Preferably, the cross-linking compound has a structure according to Formula (II):

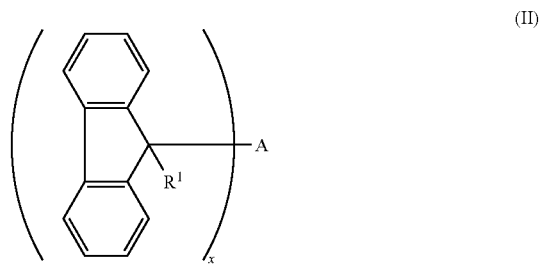

(II)

wherein A is an arene moiety having a molecular weight of less than 10,000 g/mol. $R^1$ can be hydroxide (—OH), amine (—NH$_2$), halide, ether, ester, or amide, and x is about 2.0 to about 6.0.

The arene moiety A on the cross-linking compound above provides the cross-link site for forming more complex cross-linking compound structures, including, for example, without limitation:

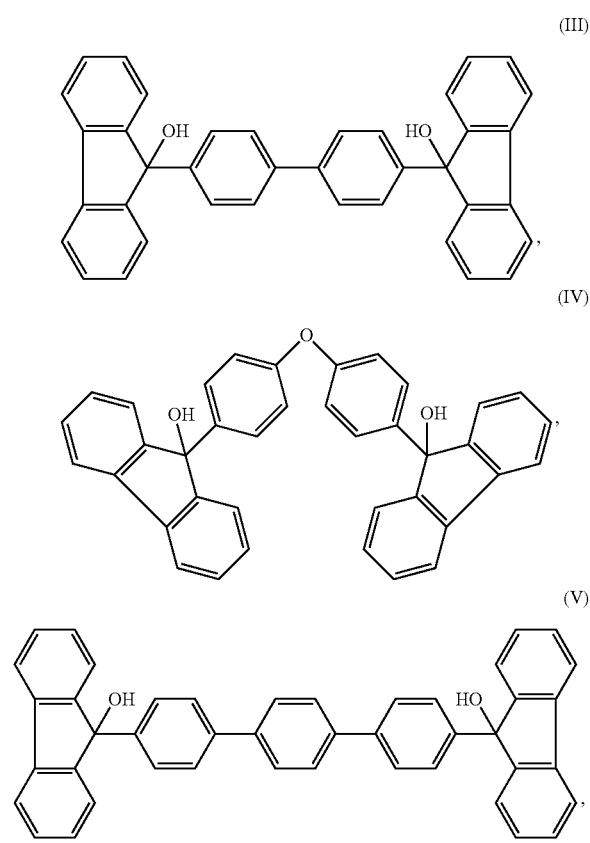

(III)

(IV)

(V)

-continued
(VI)
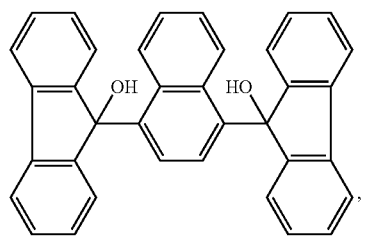
(VII)
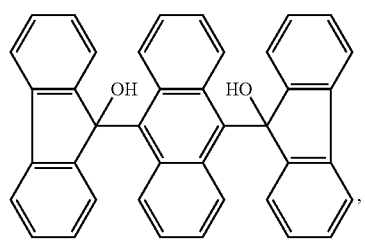
(VIII)
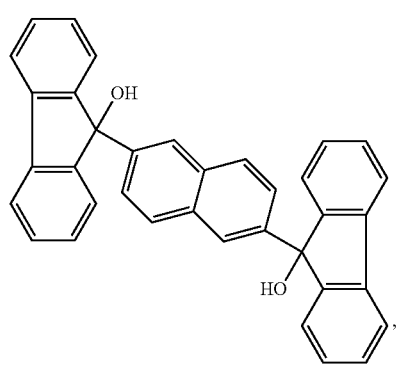
(IX)
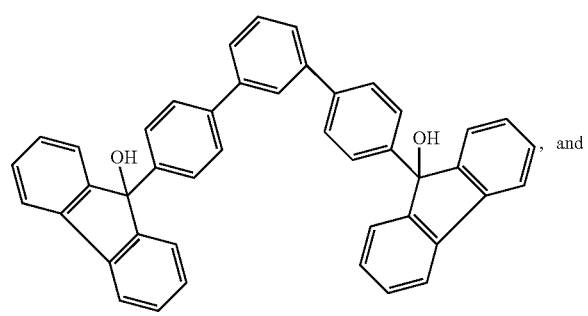, and
(X)
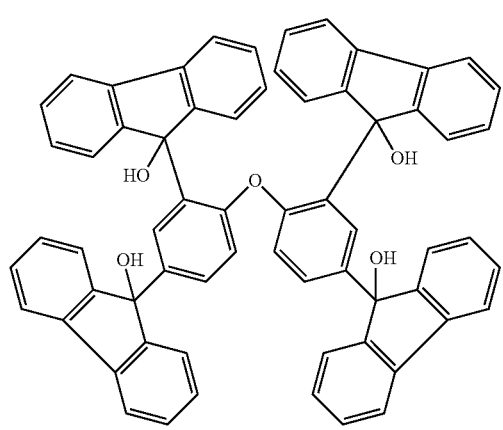
The arene moiety A may be varied to have different structures, including, but not limited to the following structures (XIIa-XIIj):
(XIIa)
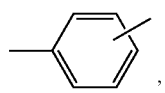
(XIIb)
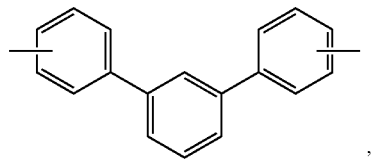
(XIIc)
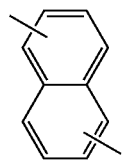
(XIId)
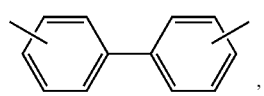
(XIIe)
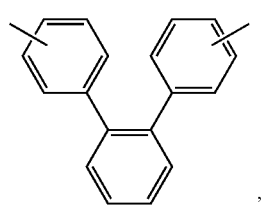
(XIIf)
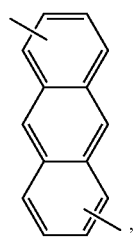
(XIIg)
(XIIh)
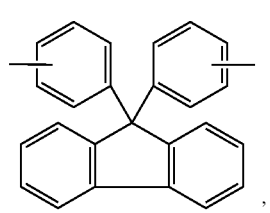

-continued

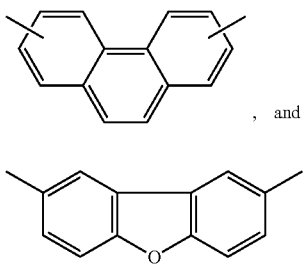
, and (XIIi)

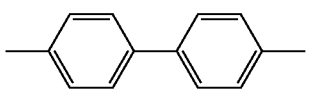
.

(XIIj)

The arene moiety A is most preferably the diradical of 4,4'-biphenyl, or

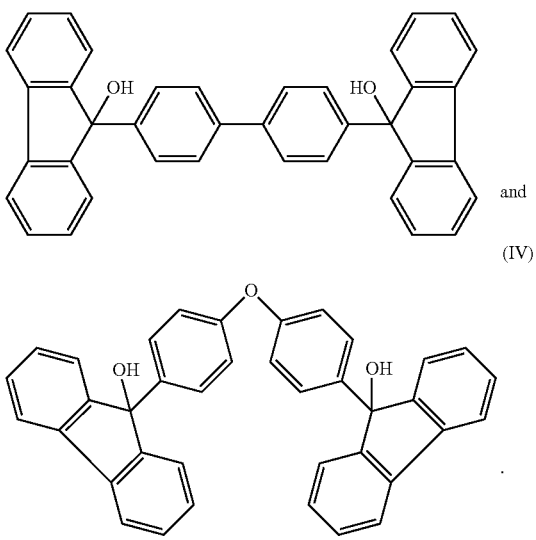

(XIId)

The arene moiety A may also be functionalized, if desired, using one or more functional groups such as, for example, and without limitation, sulfate, phosphate, hydroxyl, carbonyl, ester, halide, or mercapto.

In a preferred embodiment, the cross-linking compound is 9,9'-(biphenyl-4,4'-diyl)bis(9H-fluoren-9-ol).

Preferred diol structures as shown below for use as cross-linking compounds herein:

(III)

and (IV)

Preferred organic polymers, include commercial materials such as Ultura™ and as noted above, polyetherether ketone, high-temperature polyetherether ketone, cross-linkable grafted polyarylene ethers, 1,4-polyarylene ethers and similar polymers. Amorphous polyarylenes such as amorphous polyetherether ketone in meta and ortho orientations can be used to provide elastomeric properties at even lower temperatures, e.g., about 150° C. to about 160° C., if desired. A 1,4-polyarylene ether can be used to obtain lower glass transition temperatures in the range of about 100° C. Polyphenylene sulfides can also be used for similar glass transition temperatures.

Examples of various 1,4-polyetherether ketones in different orientations are shown below:

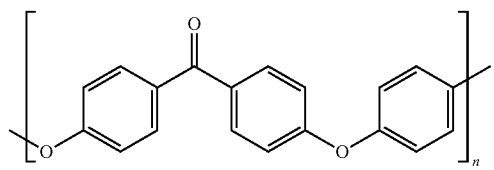
, (XIII)

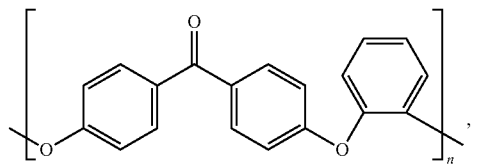
, and (XIV)

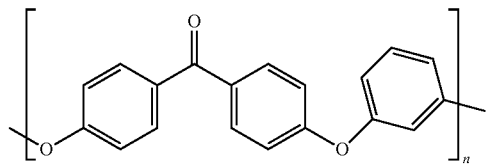

(XV)

The top structure (XIII) above represents a commercially available polyetherether ketone formed. using para-hydroquinone monomer. The middle (XIV) and bottom (XV) structures above represent ortho-PEEK and meta-PEEK, respectively. A high temperature commercial polyarylene ether organic polymer preferred for use herein is shown below as well:

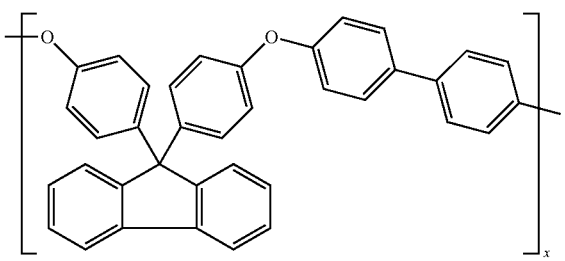

(I)

Applications for low Tg materials, i.e., those materials having a Tg of less than about 150° C., in which such materials can be put into use as elastomeric materials and benefit from the invention in higher temperature applications are preferably those end applications having a temperature about 30° C. or more greater than the low Tg material's Tg. Similarly, applications for high Tg materials, i.e., those materials having a Tg of about 150° C. or more, in which such materials may be put into use as elastomeric materials and benefit from the invention in higher temperature applications are preferably those end applications having a temperature of about 30° C. or more greater than the high Tg material's Tg.

In low Tg applications, a polyarylene ether, such as in a 1,4-polyarylene ether is shown below (XVI), which has a Tg of about 90° C. Polyphenylene sulfide has a similar structure (XVII) and glass transition temperature as polyarylene ether, so both yield similar elastomeric properties. However, because the thioether bond is less resistant to oxidation than an ether bond as in the polyarylene ether, for highly oxidizing environments polyphenylene ether would be a preferred base polymer for an oxidation resistant elastomeric composition.

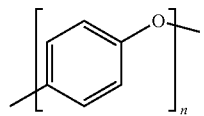

(XVI)

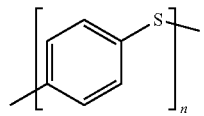

(XVII)

The cross-linking compound can be formed, for example, by treating a halogenated arene with an alkyllithium in order to exchange the halogen with lithium, followed by the addition of 9-fluorenone and acid. This method of formation is described and shown in more detail in co-pending International Patent Application No. PCT/US2011/061413, which is incorporated herein by reference in relevant part with respect to the method of formation of the cross-linking compound.

The cross-linking composition including the organic polymer may also optionally contain a cross-linking reaction additive as noted above. One or more such additives may be provided. The cross-linking reaction additive(s) include organic acids and/or acetate compounds, which can promote oligomerization of the cross-linking compound. In one embodiment, the oligomerization can be carried out by acid catalysis using one or more organic acid(s), including glacial acetic acid, acetic acid, formic acid, lactic acid, citric acid, oxalic acid, uric acid, benzoic acid and similar compounds. An oligomerization reaction using one of the cross-linking compounds listed above is as follows:

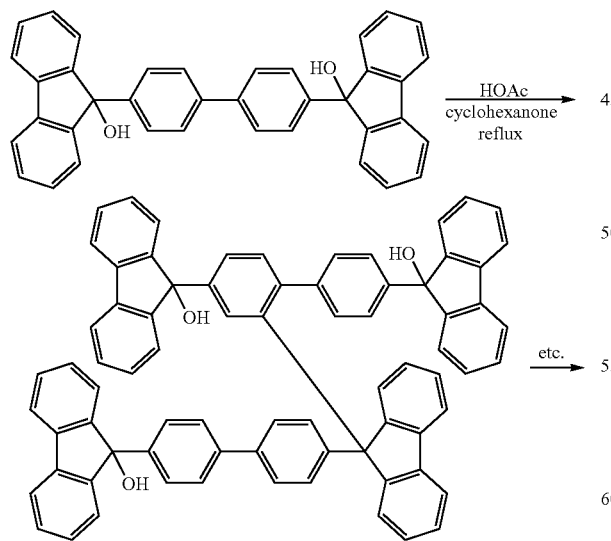

In other embodiments, inorganic acetate compounds, such as those having a structure according to formula (XI) below may also be used instead of or in combination with the organic acids:

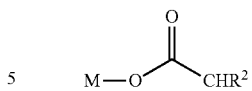

(XI)

wherein M is a Group I or a Group II metal. $R^2$ in Formula (XI) may preferably be an alkyl, aryl or aralkyl group. For example, $R^2$ may be a hydrocarbon group of 1 to about 15 carbon atoms, including normal chain and isomeric forms of methyl, ethyl, propyl, butyl, pentyl, hexyl, heptyl, octyl, nonyl, decyl, ethenyl, propenyl, butenyl, hexenyl, heptenyl, octenyl, nonenyl, decenyl, and the like. $R^2$ may also have from 0 to about 5 ester or ether groups along or in a chain of the hydrocarbon group. Suitable $R^2$ aryl and aralkyl groups, including those based on phenyl, naphthyl, and similar groups, which may each include optional lower alkyl groups on the aryl structure of from 0 to about 5 carbon atoms. $R^2$ may further include 0 to about 5 functional groups if desired such as sulfate, phosphate, hydroxyl, carbonyl, ester, halide, mercapto and/or potassium on the structure.

Oligomerization of the cross-linking compound with an acetate compound can afford the same resultant oligomerized cross-linking composition as achieved when adding an organic acid. The cross-linking reaction additive may be lithium acetate hydrate, sodium acetate, potassium acetate, rubidium acetate, cesium acetate, francium acetate, beryllium acetate, magnesium acetate, calcium acetate, strontium acetate, barium acetate, and/or radium acetate, and salts and derivatives thereof. More preferably, the cross-linking reaction additive is lithium acetate hydrate, sodium acetate and/or potassium acetate, and salts and derivatives of such compounds. An oligomerization reaction using of one of the cross-linking compounds can proceed as follows:

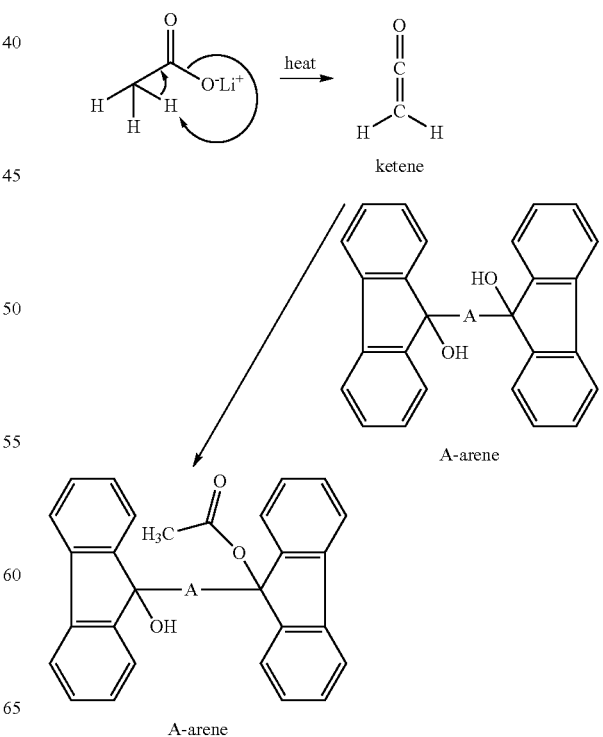

-continued

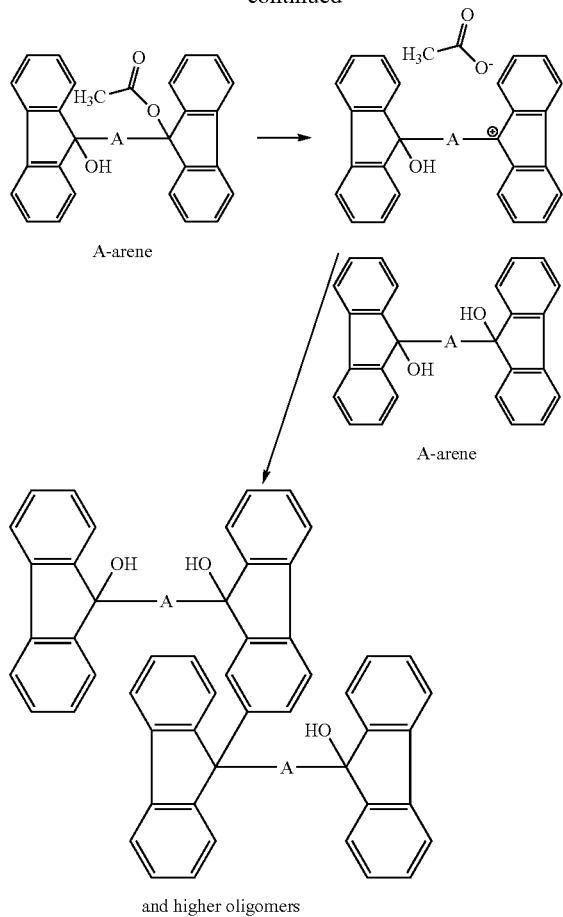

and higher oligomers

A cross-linking composition, when including both the cross-linking compound and the cross-linking reaction additive therein, preferably has a weight percentage ratio of the cross-linking compound to the cross-linking reaction additive of about 10:1 to about 10,000:1, and more preferably about 20:1 to about 1000:1 for achieving the best results. In making a cross-linking composition for use herein, in one embodiment, the components are combined prior to addition of an organic polymer to make an organic polymer composition which is then reacted for cross-linking. Alternatively, they may all be combined simultaneously. Such reaction additives are preferred for use with polyarylene ethers to control reaction rate and retard the reaction for better results.

In such a composition including a cross-linking compound used in such a cross-linking composition, the cross-linking compound is preferably about 70% by weight to about 98% by weight, more preferably about 80% by weight to about 98% by weight, and most preferably about 85% by weight to about 98% by weight based on the weight of the cross-linking composition. The amount of the cross-linking reaction additive in the cross-linking composition is preferably about 2% by weight to about 30% by weight, more preferably about 2% by weight to about 20% by weight, and most preferably about 2% by weight to about 15% by weight when used. In such an organic polymer composition, there is preferably a weight percentage ratio of the organic polymer to the combined weight of the cross-linking compound and the cross-linking reaction additive when both are used together of about 1:1 to about 100:1, and more preferably about 3:1 to about 10:1 for achieving the best results.

In making the organic polymer composition for cross-linking, it is preferred that the cross-linking compound and the cross-linking reaction additive components are combined prior to addition of an organic polymer to make an organic polymer composition. Alternatively, they may all be combined simultaneously.

The amount of the cross-linking compound in the organic polymer composition is preferably about 1% by weight to about 50% by weight, more preferably about 5% by weight to about 30% by weight, and most preferably about 8% by weight to about 24% by weight based on the total weight of an unfilled organic composition including the cross-linking compound, the cross-linking reaction additive and the organic polymer.

The amount of the cross-linking reaction additive in the organic polymer composition is preferably about 0.01% by weight to about 33% by weight, more preferably about 0.1% by weight to about 10% by weight, and most preferably about 0.2% by weight to about 2% by weight based on the total weight of an unfilled organic polymer composition including the cross-linking compound, the cross-linking reaction additive and the organic polymer.

The amount of the organic polymer in the organic polymer composition is preferably about 50% by weight to about 99% by weight, more preferably about 70% by weight to about 95% by weight, and most preferably about 75% by weight to about 90% by weight based on the total weight of an unfilled organic polymer composition including the cross-linking compound, the cross-linking reaction additive and the organic polymer.

The organic polymer composition may further be filled and/or reinforced by compounding prior to cross-linking and include one or more additives to improve the modulus, impact strength, dimensional stability, heat resistance and electrical properties of composites and other finished articles of manufacture formed using the polymer composition. These additive(s) can be any suitable or useful additives known in the art or to be developed, keeping in mind that if an elastomeric end use is contemplated, some of the fillers noted herein may be minimized or omitted as is known to those of ordinary skill in the art. Examples of fillers for use herein include without limitation continuous or discontinuous, long or short, reinforcing fibers such as, for example, carbon fiber, glass fiber, woven glass fiber, woven carbon fiber, aramid fiber, boron fiber, PTFE fiber, ceramic fiber, polyamide fiber and the like; and/or one or more fillers such as, for example, carbon black, silicate, fiberglass, calcium sulfate, boron, ceramic, polyamide, asbestos, fluorographite, aluminum hydroxide, barium sulfate, calcium carbonate, magnesium carbonate, silica, alumina, aluminum nitride, borax (sodium borate), activated carbon, pearlite, zinc terephthalate, graphite, talc, mica, silicon carbide whiskers or platelets, nanofillers, molybdenum disulfide, fluoropolymer fillers, carbon nanotubes and fullerene tubes. Preferably, the additive(s) include reinforcing fiber such as continuous or discontinuous, long or short, carbon fiber, PTFE fiber, and/or glass fiber.

In making organic polymer compositions for crosslinking, it is preferred that the additive(s) is/are added to the composition along with or at about the same time that the oligomerized cross-linking composition (or the combined components thereof) is/are combined with the organic polymer to make an organic polymer composition, however, the manner of providing reinforcing fibers or other fillers may be according to various techniques for incorporating such materials and should not be considered to limit the scope of the invention. The amount of additives is preferably about 0.5% by weight to about 65% by weight based on the weight of the organic polymer composition, and more preferably about 5.0% by weight to about 40% by weight.

In addition, the organic polymer composition to be cross-linked may further comprise other compounding ingredients, including stabilizers, flame retardants, pigments, plasticizers, surfactants, and/or dispersants such as those known or to be developed in the art to aid in the manufacturing process. In making the organic polymer composition, it is preferred that the one or more fillers is/are added to the organic polymer composition along with or at about the same time that the oligomerized crosslinking composition (or the combined components thereof) is combined with the organic polymer to make an organic polymer composition, however, as noted above, the manner of providing such materials may be according to various techniques and should not be considered to limit the scope of the invention.

The amount of the compounding ingredients that can be combined into the organic polymer composition, if used, is preferably about 5% by weight to about 60% by weight of a total of such ingredients based on the weight of the organic polymer composition, more preferably about 10% by weight to about 40% by weight, and most preferably about 30% by weight to about 40% by weight. It should be understood generally that the need for fillers traditionally associated with strengthening FFKMs may be minimized when using the organic polymers herein as the backbone of the end-use material according to this disclosure as they are generally stronger by nature.

After making a cross-linking composition as described herein, including at least one or more of the organic polymer and one or more of a cross-linking compound as described above, and in some embodiments, also one or more cross-linking reaction additive, the resulting cross-linking composition is heated to induce oligomerization of the cross-linking compound. In one embodiment of the method, the oligomerization occurs by acid catalysis. Acid catalysis is used when an organic acid is employed as the cross-linking additive. The $R^1$ functionality of the cross-linking compound of Formula (II) is dissociated from the remainder of the compound to afford a carbocation which then can undergo a Friedel-Crafts alkylation of the organic polymer, resulting in bond formation. Oligomerization of the cross-linking compound may occur by doping. Doping is accomplished by physically mixing solid form reactants in the composition at lower temperatures of about −100° C. to about −300° C. prior to reacting the overall composition for curing and/or heat molding the resulting composition to form an article.

It is also optionally within the scope of the invention to add a reacted oligomerized cross-linking composition to an organic polymer to form a cross-linkable composition. The unmodified cross-linking compound may be added directly to the organic polymer and blended with the cross-linking reaction additive to simultaneously oligomerize and bind to the organic polymer. Once the reactive oligomerized cross-linking compound reacts with the organic polymer, use of a cross-linking reaction additive if employed assists in controlling the rate of cross-linking of the organic polymer for certain aromatic polymers, particularly for polyarylene ethers, so that the cross-linking occurs at a later time in the curing process as compared to the rate of cross-linking that would occur in such an organic polymer composition having a prior art cross-linking composition using the same crosslinking compound but without the cross-linking reaction additive. The result is complete filling of the mold and a more excellent end heat molded/extruded, etc. product formed from the composite polymer during various heat molding techniques.

The compound is thus cross-linked as noted above to form a cross-linked aromatic polymer, which may be filled or unfilled.

The cross-linked aromatic polymer is preferably heated to a temperature at or above the glass transition temperature of the cross-linked aromatic polymer. This temperature may vary according to the nature of the cross-linked organic polymer. For preferred polyarylene polymers, the glass transition temperature is about 80° C. to about 350° C., and more preferably about 100° C. to about 280° C. The heating may be done deliberately or occur through application of heat in the end use application, which may be a high temperature application, however, it is preferred that cross-linking be substantially done, that is, the material be substantially cured, or more preferably complete before use in a high temperature end application. As used herein, "substantially cured" means cured to a degree where employing the material in its end application will not impact its potential elastomeric properties, and is preferably at least about 80%, more preferably at least about 90% and most preferably as fully cured as possible up to 100% cured.

It is further preferred that after forming a composition having the cross-linked organic polymer therein, that the composition be heated to form a molded article. An example of doing so includes, but is not limited to, forming powder of the organic polymer compositions of the present invention and making the same into pellets, which pellets are then subjected to a heat molding process. Heat molding of the organic polymer compositions can be accomplished by many different means already known or to be developed in the art, including extrusion, injection molding, compression molding and/or injection/compression molding. Pellets of an organic polymer composition of the present invention can be injection molded on, for example, an Arburg® 38-ton injection molding machine with a cold runner system that includes a hot sprue.

Heat molding to form an article of manufacture may be accomplished by any method known or to be developed in the art including but not limited to heat cure, cure by application of high energy, heat cure, press cure, steam cure, a pressure cure, an e-beam cure or cure by any combination of means, etc. Post-cure treatments may also be applied, if desired. The organic polymer compositions of the present invention are cured by exposing the composition to temperatures greater than about 250° C. to about 500° C., and more preferably about 350° C. to about 450° C.

The compositions and/or the methods described above may be used in or to prepare articles of manufacture for use in down-hole tools and applications used in the petrochemical industry. Particularly, the article of manufacture is selected from the group consisting of elastomeric coatings and films, elastomeric encapsulated products, insulation, packaging, connectors, and other products where traditional elastomers are not useful due to high temperature such as sealing assemblies in the shape of O-rings, V-rings, U-cups, gaskets, seal stacks, packers, diaphragms, face seals, bearings, valve seats, adapters, wiper rings, chevron back-up rings, and tubing.

In the end use, the end application of use temperature is at or above the glass transition temperature of the cross-linked organic polymer, which will vary depending on the material used. The cross-linked organic polymers herein have glass transition temperatures of about 80° C. to about 300° C. for cross-linked polyarylenes, about 180° C. to about 360° C. for cross-linked polysulfones, about 200° C. to about 290° C. for polyethersulfones, about 200° C. to about 380° C. for polyimides, about 40° C. to about 100° C. polyamides, about −50° C. to about 260° C. for polyureas, about −65° C. to about 100°

C. for polyurethanes, about 80° C. to about 130° C. for polyphthalamides, about 200° C. to about 280° C. for polyamide-imides, about 180° C. to about 300° C. for poly(benzimidazole)s, about 180° C. to about 380° C. for polyarylates, about 50° C. to about 160° C. for LCPs and about 170° C. to about 250° C. for polyaramids.

The information provided above may be used in a variety of further embodiments as noted below, wherein each component may be as described in detail above. An elastomeric material may be formed, for example, by heating a cross-linked aromatic polymer at or above its glass transition temperature. In this embodiment, the aromatic polymer is cross-linked by reaction with the cross-linking compound and/or reactive cross-linking additive or is cross-linked by thermally induced cross-linking of an aromatic polymer having a graft bonded to the aromatic polymer such as those of U.S. Pat. No. 6,060,170.

Elastomeric articles as noted above may also be formed by heat molding compositions as described above including the cross-linked aromatic polymer to form molded articles and heating the molded articles at or above a glass transition temperature of the cross-linked aromatic polymer. The aromatic polymers are cross-linked by reaction with the cross-linking compounds and/or reactive cross-linking additives as noted above or by the thermally induced cross-linking of an aromatic polymer having a graft bonded to the aromatic polymer.

An elastomeric material may be formed by providing an aromatic polymer that is non-elastomeric at room temperature; and combining it with a cross-linking compound and/or a cross-linking reaction additive. The cross-linking compound and any cross-linking reaction additive (whether added independently or formed into an oligomer) are then combined with the aromatic polymer form a cross-linked aromatic polymer that becomes elastomeric when heated at or above its glass transition temperature.

Also within the invention is an embodiment including a method of using an organic polymer in an elastomeric application. The organic polymer is cross-linked using a cross-linking compound to form a cross-linked organic polymer but can be prepared using the thermally induced graft technique of U.S. Pat. No. 6,060,170. The cross-linked polymer is then heated in use at or above a glass transition temperature such that it becomes elastomeric. The cross-linked organic polymer, may also be molded into a molded article, which is then placed in use and so that it is subjected to heat that applies to the molded article while in use in a high temperature end application so as to heat the cross-linked polymer at or above the glass transition temperature rendering the material elastomeric.

The invention will now be further described with respect to the following non-limiting examples.

EXAMPLE 1

In general, formation of cross-links in an organic polymer cross-linking to itself or in an organic polymer composition such as a polyarylene composition including an unmodified cross-linking compound may be completed within about 2 minutes at about 380° C., the typical processing temperature of polyetherether ketone (PEEK). The extent of this reaction can be tracked by dynamic viscosity measurements. The method is discussed in co-pending U.S. Non-Provisional application Ser. No. 14/165,497 of the present applicant.

Similar measurements can be used to show the point of degradation when measuring gel point, G' in Pa against temperature in ° C. Dynamic mechanical analysis (rectangular torsion) of samples of cross-linked Ultura™ polymer from Greene, Tweed & Co., Inc, Kulpsville, Pa. was done and compared to filled and unfilled, peroxide-curable terpolymers of tetrafluoroethylene (TFE), perfluoromethylvinyl ether (PMVE) and a curesite monomer having a functional group to permit crosslinking with a peroxide curative and co-curative as are well known the art for forming typical peroxide-curable FFKM materials.

As can be seen from FIG. 1, severe degradation of the FFKM material formed occurred at 350° C. and above, whereas the crosslinked Ultura™ material remained stable. This is shown by the significant drop in modulus of FFKM at these temperatures, whereas the Ultura sample modulus is maintained at temperatures up to at least 400° C.

Figure 2:
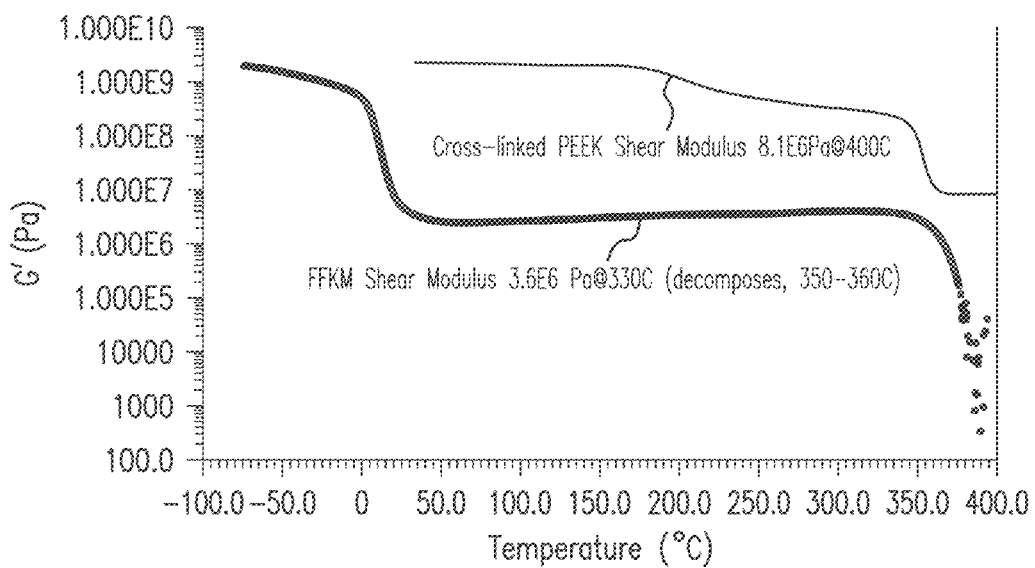
FIG. 2 is a graphical representation of the relationship of G' to temperature to show a degradation curve for a cross-linked polyetherether ketone (PEEK) material having a shear modulus of $8.1 \times 10^6$ Pa at 400° C. and an FFKM having a shear modulus of $3.6 \times 10^6$ at 330° C.

Similar results are shown in FIG. 2 using a cross-linked polyetherether ketone (PEEK) material having a shear modulus of $8.1 \times 10^6$ Pa at 400° C. in comparison with an FFKM having a shear modulus of $3.6 \times 10^6$ at 330° C.

The above-noted cross-linked polyarylene polymers enabled use of commercially available materials which can be compounded with fillers and a crosslinking compound and/or reactive crosslinking additive if desired to yield high temperature performance elastomeric materials and end products. The levels of cross-linking can be controlled using the cross-linking compounds and/or reactive crosslinking additives noted above (or the thermally induced process referenced above) to give higher or lower cross-link density for varied elastomeric effects by simply modifying the amount of the cross-linking additives used.

Figure 3:
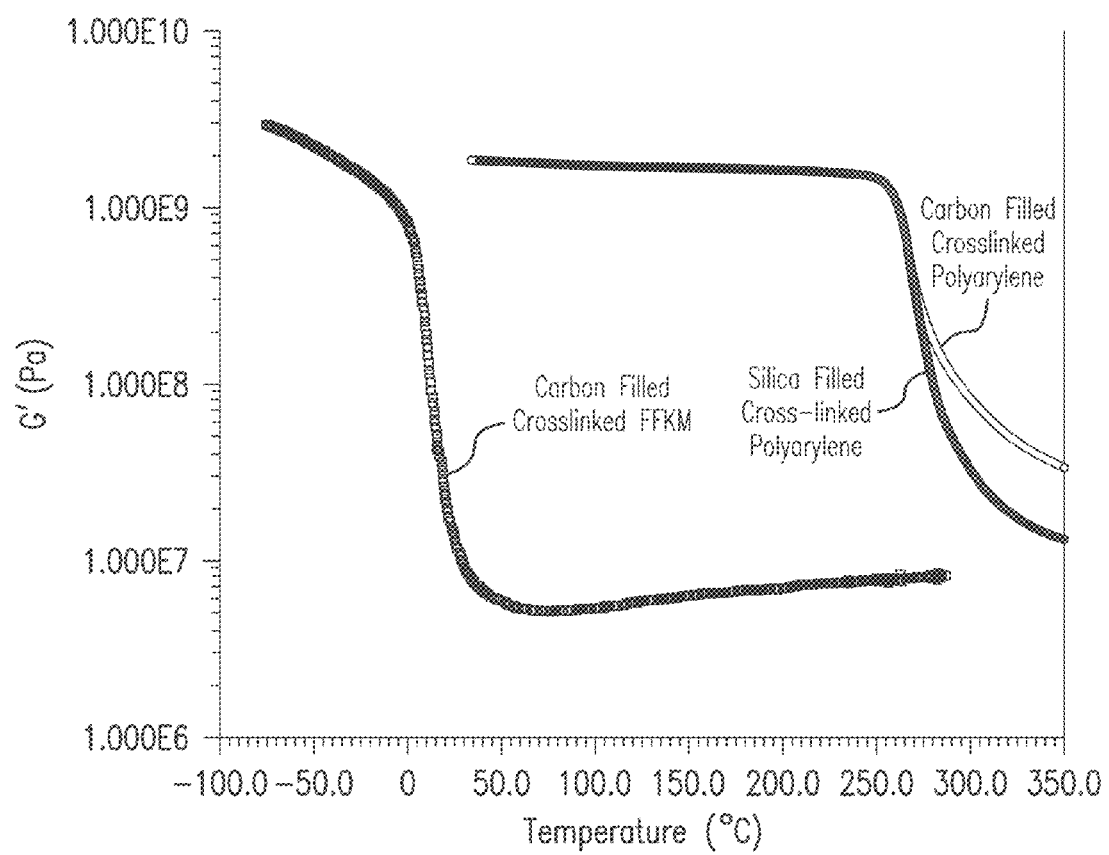
FIG. 3 is a graphical representation of G' to temperature to show the modulus for filled and unfilled cross-linked polyarylene systems at or above the decomposition temperature of the comparative FFKM in Example 1.

FIG. 1 demonstrates that the modulus of the unfilled cross-linked polyarylenes tested was higher than the FFKM tested (with or without fillers). The addition of fillers to a cross-linked polyarylene herein would allow for further increase in already beneficial properties. FIG. 3 shows the higher modulus at the temperatures tested for filled cross-linked polyarylene systems at or above the decomposition temperature of the comparative FFKM.

The relative improvements over the comparable FFKMs tested in the attached FIGS. 1-3 are shown below in Table 1 which provides the comparative shear moduli for the FFKM and polyarylene ether materials tested. It is to be noted that most FFKM data points were reported at 287° C. as the FFKM typically degrades at temperatures of 350° C. The cross-linked polyarylene material properties were measured at 350° C.

TABLE 1

| Elastomer | Filler | Shear Modulus (Pa) | Shear Modulus (psi) | Improvement |
| --- | --- | --- | --- | --- |
| FFKM (unfilled, modified) | None | $3.6 \times 10^6$ | 522 | — |
| FFKM (filled) | Carbon Black | $2.72 \times 10^6$ | 395 @350° C. | — |
| FFKM (filled) | Carbon Black | $8.17 \times 10^6$ | 1,185 | — |
| Crosslinked Ultura ™ | None | $8.80 \times 10^6$ | 1,276 | 2.44 |
| Crosslinked Ultura ™ | Carbon Black | $3.30 \times 10^7$ | 4,786 | 4.04 |
| Crosslinked Ultura ™ | Silica | $1.30 \times 10^7$ | 1,885 | 1.59 |

EXAMPLE 2

Testing was carried out in this Example on cross-linked polyphenylene sulfide (PPS) with a goal of compounding PPS having different levels of a crosslinker formed according to formula (II) herein, specifically 9,9'-(biphenyl-4,4'-diyl) bis(9H-fluoren-9-ol), and further to cure the material so that no crystallinity is observed and the material behaves as a rubber.

Typical cross-link densities of high performance elastomeric materials range from 3-7%. (See, Klingender, R. C., Ed.; In Handbook of Specialty Elastomers; CRC Press: Boca Raton, Fla. 2008, 102). For PPS with a repeat unit weight of 108, and including 9,9'-biphenyl-4,4'-diylbis(9H-fluoren-9-ol) as a cross-linking compound, with a repeat unit weight of 514, mixtures of the percentages listed in the Table 2 below yielded molar ratios in the range of 1.8% to 6.6% (wherein moles were calculated based on a 100 gram batch. Thus formulations of PPS with the noted cross-linking compound were determined so as to use amounts required to yield crosslink percentages in the range of 2 to 7%, based on the molar concentration of the repeat unit of PPS in the calculated 100 gram sample.

TABLE 2

| % Crosslinking Compound | Moles PPS | Moles Crosslinking Compound | Molar Ratio |
|---|---|---|---|
| 8 | 0.85 | 0.016 | 1.8% |
| 16 | 0.78 | 0.031 | 4.0% |
| 24 | 0.70 | 0.047 | 6.6% |

Figure 4:
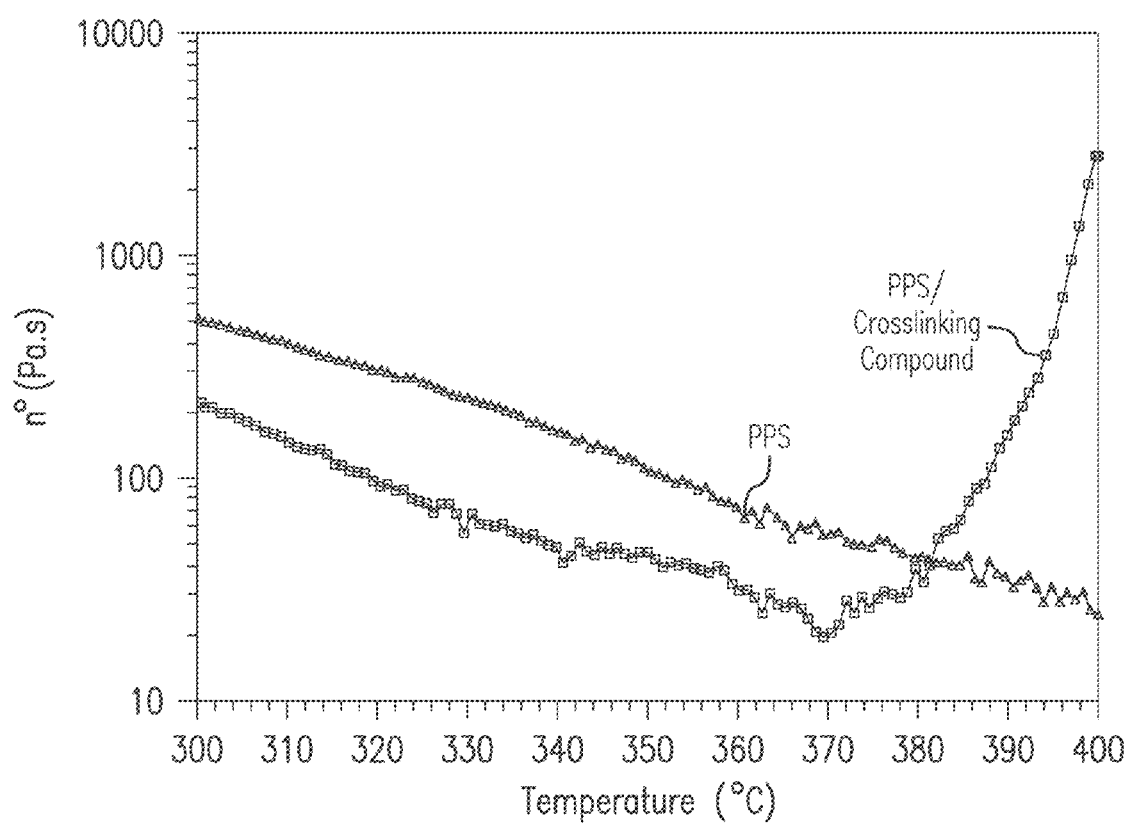
FIG. 4 is a graphical representation of the relationship between viscosity and temperature showing parallel plate rheology of neat polyphenylene sulfide (PPS) shown in the top curve and of PPS combined with a crosslinking compound bottom curve in Example 2.

Procedures: High molecular weight PPS powder was mixed with the cross-linking compound in an amount of 16% by weight in a SPEX freezer mill. Approximately 20 mg of the powder mixture was compressed into an 8 mm diameter tablet in a manual Carver® hydraulic press at 5 tons applied pressure. 8 mm, parallel plate rheology was performed on the tablet to determine appropriate cure temperatures (see, FIG. 4). Cure appeared to take place at temperatures above 380° C., as based on the inflection point and significant increase in viscosity. See, FIG. 4, which shows parallel plate rheology of neat PPS in the top curve and PPS with the crosslinking compound in the bottom curves. Note there was a smooth decrease in viscosity of the neat PPS and a sharp increase in viscosity of the cross-linked PPS at temperatures above 370° C.

Materials: PPS: a high molecular weight commercially available grade of PPS (Fortron®, from Celenese) was used. The cross-linking compound was the same as that of Example 1 in 99.9% pure form. Mixtures of 8%, 16% and 24% crosslinking compound in PPS were prepared via in-line compounding with a Thermo Haake™ extruder at melt temperatures >295° C. The weight of each sample is noted below:

PPS=1860 grams
PPS with 8% Crosslinking Compound=2105 grams
PPS with 16% Crosslinking Compound=2043 grams
PPS with 24% Crosslinking Compound=2025 grams Pellets of neat PPS, PPS with 8% crosslinking compound and with 16% crosslinking compound were injection molded into test bars in an Arburg™ 38-ton, injection molding machine, and were processed at temperatures >310° C. The 24% crosslinking compound in PPS mixture was not readily injection moldable as the high diol content increased the cross-linking rate and did not readily allow for injection molding of test bars.

Figure 5:
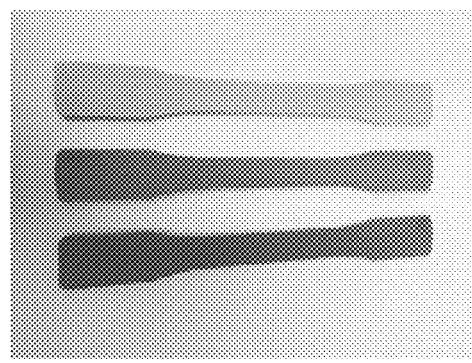
FIG. 5 is a photographic representation of samples from Example 2 in the form of injection molded Type 1 tensile bars of neat PPS (see top bar), 8% crosslinking compound in PPS (middle bar), and 16% crosslinking compound.

FIG. 5 shows a photo of injection molded Type 1 tensile bars of neat PPS (see top bar), 8% crosslinking compound in PPS (middle bar), and 16% crosslinking compound in PPS.

Specimens from the bars were cut into 8 mm disks and tested via parallel plate rheology by holding at 380° C. for 60 minutes.

Figure 6:
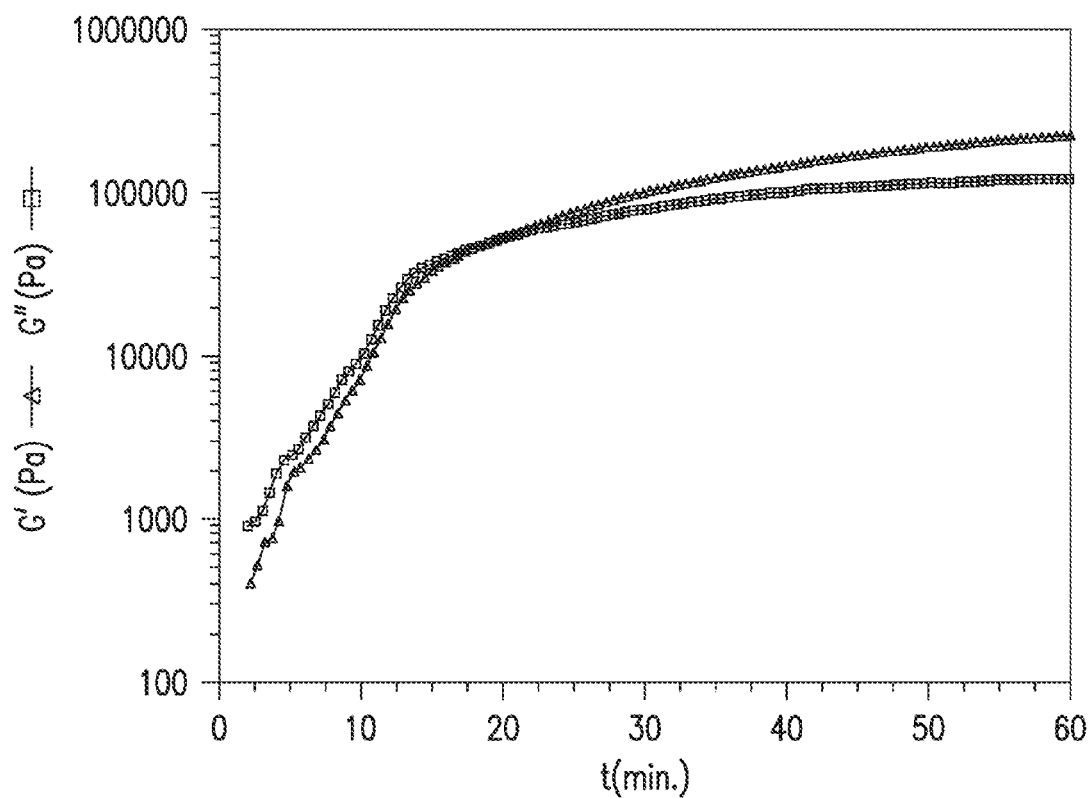
FIG. 6 is a graphical representation showing the crossover point for G and G' for the 8% crosslinking compound/PPS sample of Example 2 on a plot over time at 20 minutes.
Figure 7:
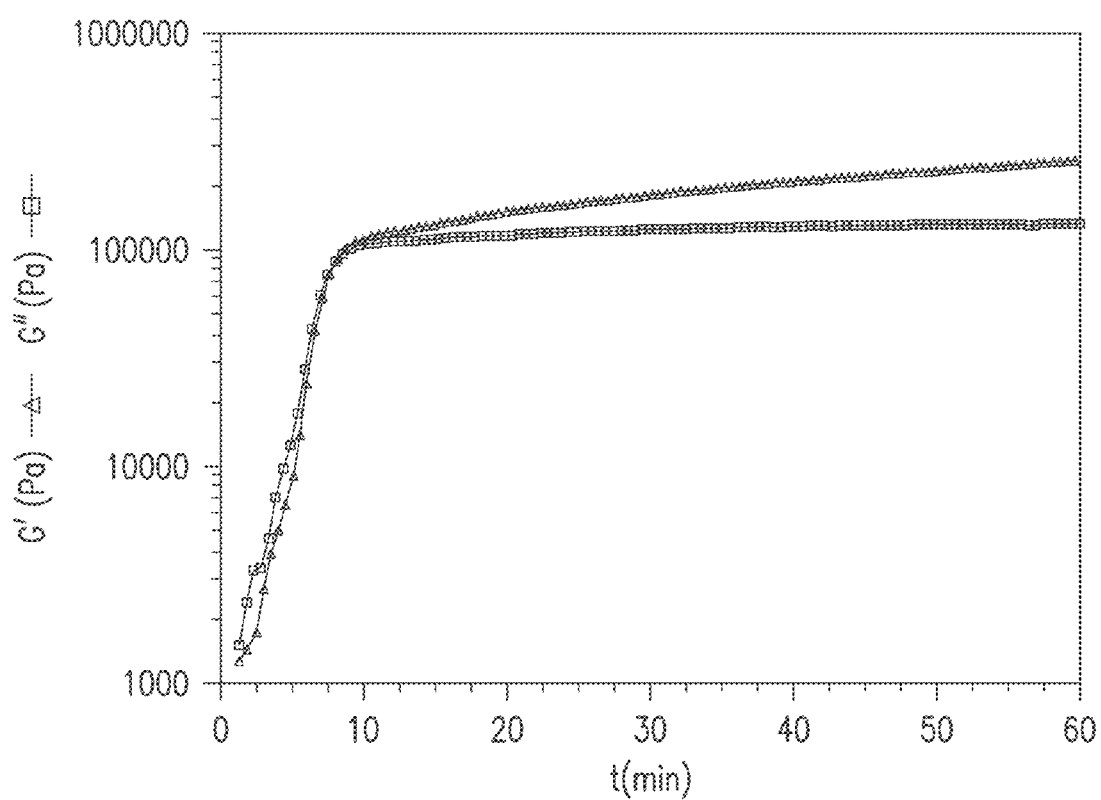
FIG. 7 is a graphical representation showing the crossover point of G and G' for the 16% crosslinking compound/PPS sample of Example 2 on a plot over time at about 8 minutes.

A post-cure test was conducted at a temperature of 380° C. for 1 hr, which test was performed on an 8 mm disk cut from an injection molded tensile bar of the 8% crosslinking compound/PPS sample. FIG. 6 shows the crossover point of G and G' plotted over time for the 8% crosslinking compound/PPS sample, wherein the crossover point occurred at 20 minutes. The same test was done on the 16% crosslinking compound/PPS sample. FIG. 7 shows the crossover point of G and G' plotted over time for the 16% crosslinking compound/PPS sample, which occurred at about 8 minutes.

Samples of the cured material were then analyzed via a temperature ramp to determine the modulus properties in relation to temperature, including modulus at the rubbery plateau.

Figure 8:
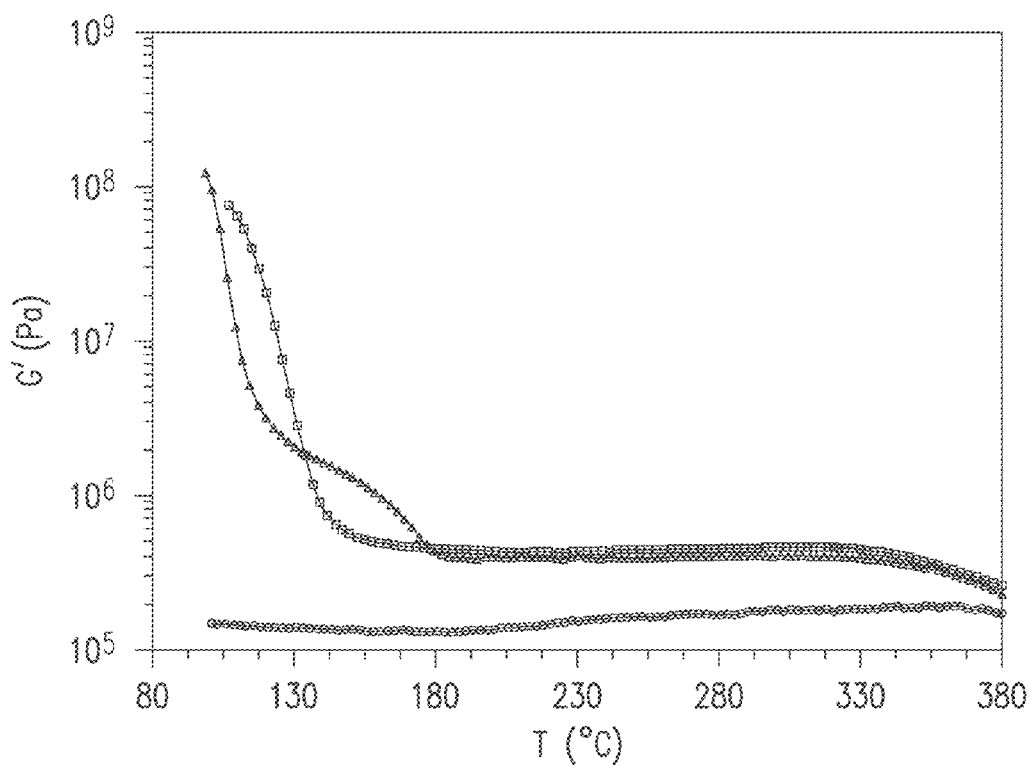
FIG. 8 is a graphical representation of G' against temperature to show the comparative modulus of the 8% and 16% crosslinking compound/PPS samples in Example 2, compared with a sample of unfilled FFKM rubber.

FIG. 8 shows the comparative modulus of the 8% and 16% crosslinking compound/PPS samples, compared with a sample of unfilled FFKM rubber. The plot shows a 2nd modulus plateau for the 8% sample at temperatures between 100° C. and 180° C., which is indicative of some crystallinity. The 16% plot shows rubbery behavior at temperatures above 150° C. This test was run using DMA of an 8 mm disk sample. In FIG. 8, the triangles reference the 8% sample, the squares represent the 16% sample and the circles represent the unfilled FFKM sample. Table 2 below shows the comparative modulus at different temperatures.

TABLE 3

| G* (Pa) | 200° C. | 250° C. | 300° C. |
|---|---|---|---|
| FFKM | $1.37 \times 10^5$ | $1.66 \times 10^5$ | $1.84 \times 10^5$ |
| PPS + 8% Crosslinking Compound | $4.06 \times 10^5$ | $4.04 \times 10^5$ | $4.14 \times 10^5$ |
| PPS + 16% Crosslinking Compound | $4.40 \times 10^5$ | $4.55 \times 10^5$ | $4.74 \times 10^5$ |

The modulus ratio (normalized to FFKM) to show the comparison of each sample to the modulus of an FFKM is shown below in Table 4

TABLE 4

| Modulus Ratio/FFKM | 200° C. | 250° C. | 300° C. |
|---|---|---|---|
| PPS + 8% Crosslinking Compound | 3.0 | 2.4 | 2.2 |
| PPS + 16% Crosslinking Compound | 3.2 | 2.7 | 2.6 |

A 60-minute, isothermal hold was performed on the FFKM sample, and the modulus dropped by >99% at that time, indicating severe degradation of the material. In contrast, the PPS/crosslinking compound samples tested maintained a steady shear modulus after a 60 minute isothermal hold. This is a strong indication that the cured PPS/crosslinking compound systems are stronger and more thermally stable than FFKM.

Figure 9:
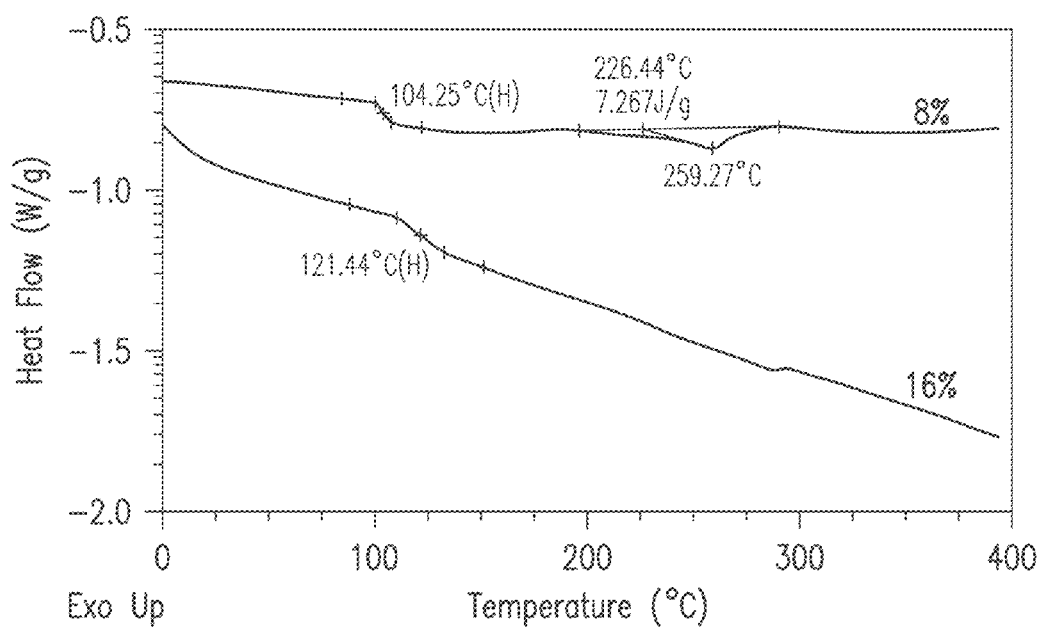
FIG. 9 is a graphical representation of a DSC scan of PPS/crosslinking samples from Example 2 showing low crystallinity for the 8% crosslinking compound sample, and no measurable crystallinity in the 16% crosslinking compound sample.

FIG. 9 is a DSC scan showing the thermal behavior of the two PPS samples having 8% and 16% crosslinking compound. The DSC showed low crystallinity in the 8% sample, and no measurable crystallinity in the 16% sample. The crystallinity is demonstrated with reference to Table 5 below.

TABLE 5

| % Crosslinking Compound | Melting Endotherm (ΔH) (J/g) | Crystallinity | Tg (DSC) |
|---|---|---|---|
| 0 | 64.57 | 62% | 94 |
| 8 | 7 | 7% | 104 |
| 16 | 0 | 0% | 121 |
| 24 | Not Tested | Not Tested | Not Tested |

Note that with respect to the above data, 103.8 J/g is the heat of fusion for 100% crystalline PPS. In summary, the results showed that ranges of about 8 to about 24% crosslinking compound was successfully compounded with PPS. However, amounts of about 24% in PPS were not readily injection moldable, and if molded would have a higher Tg than the 16% blend.

The 8% crosslinking compound in PPS showed only a low level of crystallinity, which while not preferred is an improvement (it is not preferred as some melting would occur over the temperature range of the Tg to 300° C.). The 16% crosslinking compound in PPS showed a Tg in the 120° C. range, and no crystallinity. Thus, it would be elastomeric in behavior from 130° C. to 380° C. and up to a decomposition temperature of over 400° C. In comparison the FFKM elastomer had a lower moduli vs. temperature and a worse thermal stability than the 16% crosslinking compound/PPS sample, which was the best performing sample and optimal PPS compound tested. This formulation allowed for injection molding of a shape and yielded a material with superior thermal stability and elastomeric properties in comparison to a standard FFKM.

Such materials as illustrated in this Example and others made according to the inventions and disclosure herein can be used for a wide variety of end applications as noted above subjected to high temperature end applications requiring elastomeric materials with resistance to harsh chemicals and/or operating conditions. Such materials may also have use as shape change polymers wherein the materials are heated above their glass transition temperatures and cooled so as to remain stretched until heated above their glass transition temperature again. Such techniques may also be applied to other polymers to provide materials with varied glass transition temperatures or to provide different melting points to expand an elastomeric use range for a given polymer, e.g., for 1,4-polyarylene ether, having a glass transition temperature of about 90° C., or for polyphenylene sulfide, also with a Tg of about 90° C., an elastomer may be formed using that material and crosslinking it to provide a glass transition temperature of about 100° C. to about 120° C. and reducing crystallinity from crosslinking, making it useable as an elastomer at temperatures of about 140° C. and above. Solvents and plasticizers can also be employed to allow for reduction of glass transition temperatures and inhibition of crystallinity for the cross-linked materials herein to alter the glass transition temperatures of material to a lower range.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of preparing an elastomeric material, comprising
   (a) providing an aromatic polymer which is non-elastomeric at room temperature;
   (b) cross-linking the aromatic polymer using a cross-linking compound to form a cross-linked aromatic polymer that is substantially cured, wherein the cross-linking compound has a structure according to formula (II):

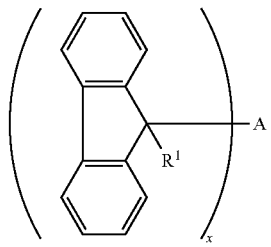

(II)

wherein A is an arene moiety having a molecular weight of less than 10,000 g/mol, $R^1$ is selected from a group consisting of hydroxide (—OH), amine (—$NH_2$), halide, ether, ester, or amide, and x is about 2.0 to about 6.0; and
   (c) heating the cross-linked aromatic polymer to a temperature at or above a glass transition temperature of the cross-linked aromatic polymer.

2. The method of preparing an elastomeric material according to claim 1, wherein, in step (b), the aromatic polymer is at least about 80% cured.

3. The method of preparing an elastomeric material according to claim 2, wherein the aromatic polymer is at least about 90% cured.

4. The method of preparing an elastomeric material according to claim 3, wherein the aromatic polymer is fully cured.

5. The method of preparing an elastomeric material according to claim 1, wherein the aromatic polymer is selected from the group consisting of poly(arylene ether)s, polysulfones, polyethersulfones, polyarylene sulfides, polyimides, polyamides, polyureas, polyurethanes, polyphthalamides, polyamide-imides, poly(benzimidazole)s, polyarylates, liquid crstalline polymers (LCPs) and polyaramids.

6. The method of preparing an elastomeric material according to claim 1, wherein the aromatic polymer is a poly(arylene ether) including polymer repeating units having the following structure:

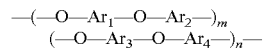

wherein $Ar^1, Ar^2, Ar^3$ and $Ar^4$ are identical or different aryl radicals, m=0 to 1.0, and n=1 m.

7. The method of preparing an elastomeric material according to claim 1, wherein the cross-linking compound has a structure selected from a group consisting of

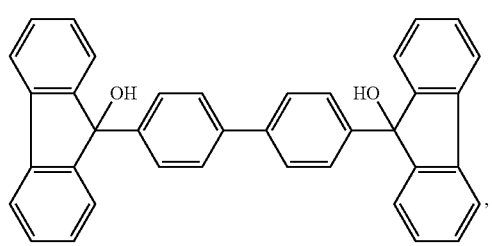

(III)

(IV)

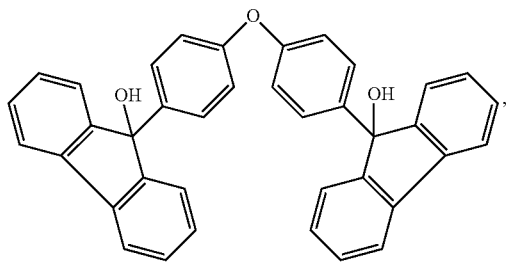

(V)

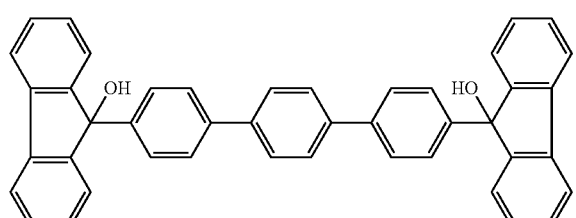

(VI)

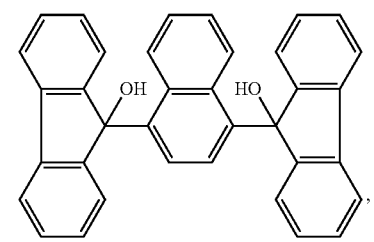

(VII)

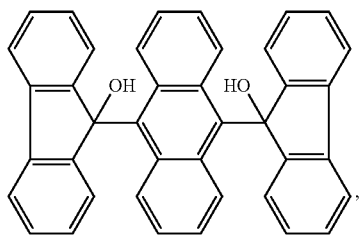

(VIII)

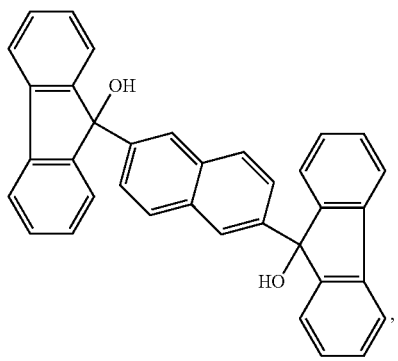

(IX)

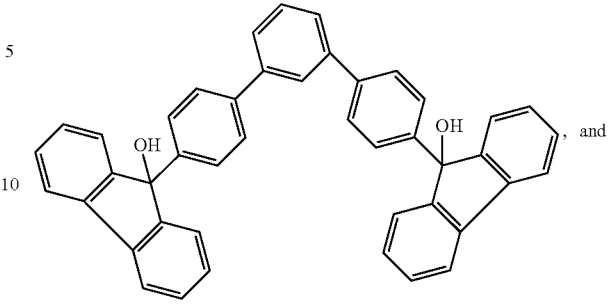, and (X)

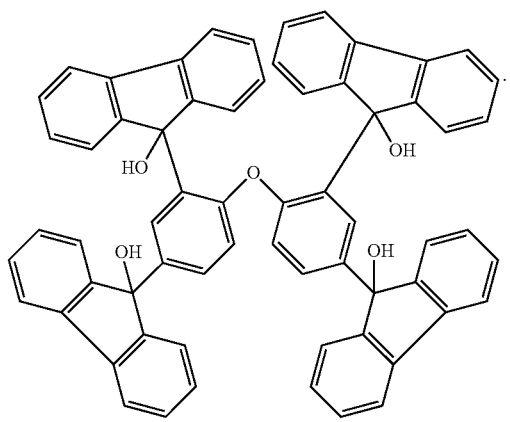

8. The method of preparing an elastomeric material according to claim 1, wherein the arene moiety has a molecular weight of about 1,000 g/mol to about 9,000 g/mol.

9. The method of preparing an elastomeric material according to claim 1, wherein the arene moiety has a molecular weight of about 2,000 g/mol to about 7,000 g/mol.

10. The method of preparing an elastomeric material according to claim 1, wherein step (b) further comprises cross-linking the organic polymer with the cross-linking compound and a cross-linking reaction additive selected from an organic acid and/or an acetate compound, wherein the cross-linking reaction additive is capable of reacting with the cross-linking compound to form a reactive intermediate in the form of an oligomer, which reactive intermediate oligomer is capable of cross-linking the organic polymer.

11. The method of preparing an elastomeric material according to claim 10, wherein the cross-linking reaction additive is an organic acid selected from glacial acetic acid, formic acid, and/or benzoic acid.

12. The method of preparing an elastomeric material according to claim 10, wherein the cross-linking reaction additive is an acetate compound having a structure according to formula (XI):

(XI)

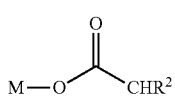

wherein M is a Group I or a Group II metal; and $R^2$ is a alkyl, aryl or aralkyl group, wherein the alkyl group comprises a hydrocarbon group of 1 to about 15 carbon atoms which has from 0 to about 5 ester or ether groups along or in a chain of the hydrocarbon group, and wherein $R^2$ comprises 0 to about 5 functional groups selected from sulfate, phosphate, hydroxyl, carbonyl, ester, halide, mercapto or potassium.

13. The method of preparing an elastomeric material according to claim 12, wherein the acetate compound is selected from lithium acetate hydrate sodium acetate, and/or potassium acetate, and salts and derivatives thereof.

14. The method of preparing an elastomeric material according to claim 10, wherein the weight percentage ratio of the cross-linking compound to the cross-linking reaction additive is about 10:1 to about 10,000:1.

15. The method of preparing an elastomeric material according to claim 14, wherein the weight percentage ratio of the cross-linking compound to the cross-linking reaction additive is about 20:1 to about 1000:1.

16. The method of preparing an elastomeric material according to claim 1, wherein the method further comprises forming a composition comprising the cross-linked organic polymer and heating the composition to form a molded article and step (c) further comprises placing the molded article in use at a temperature at or above the glass transition temperature of the cross-linked organic polymer.

17. An article formed by the method of claim 1.

18. The article according to claim 17, selected from the group consisting of an O-ring, a V-ring, a U-cup, a gasket, at least one component of a seal stack, a packer element, a diaphragm, a thee seal, a bearing, a valve seat, an adapter, a wiper ring, a chevron seal back-up ring, an tubing.

19. A method of preparing an elastomeric material, comprising
(a) providing an aromatic polymer which is non-elastomeric at room temperature;
(b) cross-linking the aromatic polymer using a cross-linking compound to form a cross-linked aromatic polymer that is substantially cured; and
(c) heating the cross-linked aromatic polymer to a temperature at or above a glass transition temperature of the cross-linked aromatic polymer,
and wherein the aromatic polymer is a poly(arylene ether), and the polymer has repeating units having the structure of formula (I):

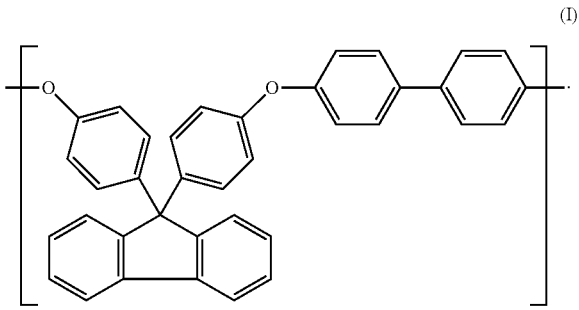

(I)

20. An elastomeric material formed by heating a cross-linked aromatic polymer that is substantially cured at or above a glass transition temperature of the cross-linked aromatic polymer, wherein the aromatic polymer is not elastomeric at room temperature prior to cross-linking, and wherein the aromatic polymer is cross-linked by reaction with a cross-linking compound having a structure according to formula (II):

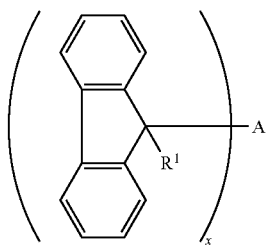

(II)

wherein A is an arene moiety having molecular weight of less than 10,000 g/mol, $R^1$ is selected from a group consisting of hydroxide(—OH), amine (—NH$_2$), halide, ether, ester, or amide, and x is about 2.0 to about 6.0, or by thermally induced cross-linking of an aromatic polymer having a graft bonded to the aromatic polymer.

21. An elastomeric article formed by heat molding a composition comprising a cross-linked aromatic polymer to form a molded article, wherein the aromatic polymer is not elastomeric at room temperature prior to cross-linking, and wherein the cross-linked aromatic polymer is substantially cured, and heating the molded article at or above a glass transition temperature of the cross-linked aromatic polymer, wherein the aromatic polymer is cross-linked by reaction with a cross-linking compound having a structure according to formula (II):

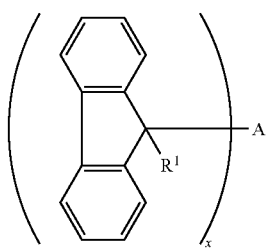

(II)

wherein A is an arene moiety having a molecular weight of less than 10,000 g/mol, $R^1$ is selected from a group consisting of hydroxide (—OH),amine (—NH$_2$) halide, ether, ester, or, amide, and x is about 2.0 to about 6.0, or by thermally induced cross-linking of an aromatic polymer having a graft bonded to the aromatic polymer.

22. A composition for forming an elastomeric material, comprising
an aromatic polymer that is non-elastomeric at room temperature; and
a cross-linking compound, wherein the cross-linking compound and the aromatic polymer can react to form a cross-linked aromatic polymer that becomes elastomeric when heated at or above a glass transition temperature of the cross-linked aromatic polymer, and the cross-linking compound has a structure according to formula (II):

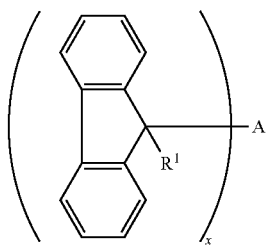

(II)

wherein A is an arene moiety having a molecular weight of less than 10,000 g/mol, $R^1$ is selected from a group consisting of hydroxide (—OH) amine (—NH$_2$), halide, ether, ester, or amide, and x is about 2.0 to about 6.0.

23. A method of using an organic polymer that is not elastomeric at room temperature in an elastomeric application, comprising
cross-linking the organic polymer using a cross-linking compound to form a cross-linked organic polymer to substantially cure the aromatic polymer, wherein the cross-linking compound has as structure according to formula(II):

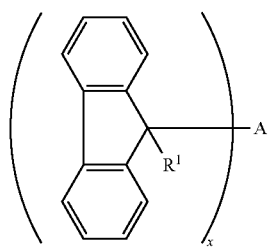

wherein A is an arene moiety having a molecular weight of less than 10 000 g/mol, $R^1$ is selected from a group consisting of hydroxide (—OH), amine (—NH$_2$), halide, ether, ester, or amide, and x is about 2.0 to about 6.0; and
heating the cross-linked polymer in use at or above a glass transition temperature of the cross-linked polymer such that it becomes elastomeric.

24. The method of using an organic polymer in an elastomeric composition according to claim 23, further comprising forming a composition comprising the cross-linked organic polymer, molding the composition into a molded article, placing the molded article in use and heating the molded article in use so as to heat the cross-linked polymer at or above the glass transition temperature of the cross-linked polymer.

25. A method of preparing an elastomeric material, comprising
(a) providing an aromatic polymer which is non-elastomeric at room temperature;
(b) cross-linking the aromatic polymer using a cross-linking compound to form a cross-linked aromatic polymer, wherein the cross-linking compound has a structure according to formula (II):

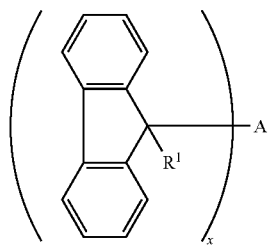

wherein A is an arene moiety having a molecular weight of less than 10,000 g/mol, $R^1$ is selected from a group consisting of hydroxide (—OH), amine (—NH$_2$), halide, ether, ester, or amide, and x is about 2.0 to about 6.0; and
(c) heating the cross-linked aromatic polymer to a temperature at or above a glass transition temperature of the cross-linked aromatic polymer.

26. The method of preparing an elastomeric material according to claim 25, wherein, in step (b), the aromatic polymer is at least about 80% cured.

27. The method of preparing an elastomeric material according to claim 26, wherein the aromatic polymer is at least about 90% cured.

28. The method of preparing an elastomeric material according to claim 27, wherein the aromatic polymer is fully cured.

29. A method of preparing an elastomeric material according to claim 25, wherein the aromatic polymer is selected from the group consisting of poly(arylene ether)s, polysulfones, polyethersulfones, polyarylene sulfides, polyimides, polyamides, polyureas, polyurethanes, polyphthalamides, polyamide-imides, poly(benzimidazole)s, polyarylates, liquid crstalline polymers (LCPs) and polyaramids.

30. The method of preparing an elastomeric material according to claim 29, wherein the aromatic polymer is a poly(arylene ether) including polymer repeating units having the following structure:

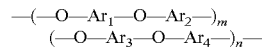

wherein $Ar^1$, $Ar^2$, $Ar^3$ and $Ar^4$ are identical or different aryl radicals, m=0 to 1.0, and n=1 m.

31. The method of preparing an elastomeric material according to claim 30, wherein step (b) further comprises cross-linking the organic polymer with the cross-linking compound and a cross-linking reaction additive selected from an organic acid and/or an acetate compound, wherein the cross-inking reaction additive is capable of reacting with the cross-linking compound to form a reactive intermediate in the form of an oligomer, which reactive intermediate oligomer is capable of cross-linking the organic polymer.

32. The method of preparing an elastomeric material according to claim 31, wherein the cross-linking reaction additive is an organic acid selected from glacial acetic acid, formic acid, and/or benzoic acid.

33. The method of preparing an elastomeric material according to claim 31, wherein the cross-linking reaction additive is an acetate compound having a structure according to formula (XI):

wherein M is a Group I or a Group II metal; and $R^2$ is a alkyl, aryl or aralkyl group, wherein the alkyl group comprises a hydrocarbon group of 1 to about 15 carbon atoms which has from 0 to about 5 ester or ether groups along or in a chain of the hydrocarbon group, and wherein $R^2$ comprises 0 to about 5 functional groups selected from sulfate, phosphate, hydroxyl, carbonyl, ester, halide, mercapto or potassium.

34. The method of preparing an elastomeric material according to claim 33, wherein the acetate compound is selected from lithium acetate hydrate sodium acetate, and/or potassium acetate, and salts and derivatives thereof.

35. The method of preparing an elastomeric material according to claim 31, wherein the weight percentage ratio of the cross-linking compound to the cross-linking reaction additive is about 10:1 to about 10,000:1.

36. The method of preparing an elastomeric material according to claim 35, wherein the weight percentage ratio of the cross-linking compound to the cross-linking reaction additive is about 20:1 to about 1000:1.

37. The method of preparing an elastomeric material according to claim 30, wherein the organic polymer is a poly(arylene ether), m is 1 and n is 0 and the polymer has repeating units having the structure of formula (I):

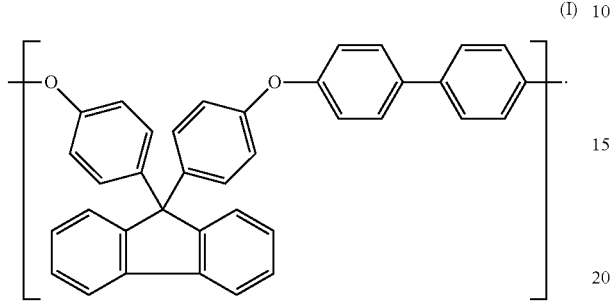
(I)

38. The method of preparing an elastomeric material according to claim 25, wherein the cross-linking compound has a structure selected from a group consisting of

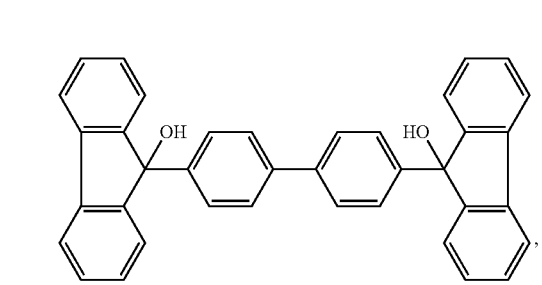
(III)

(IV)

(V)

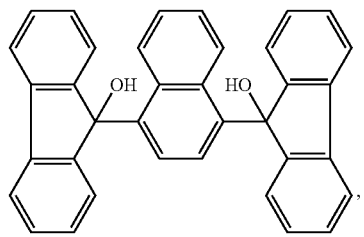
(VI)

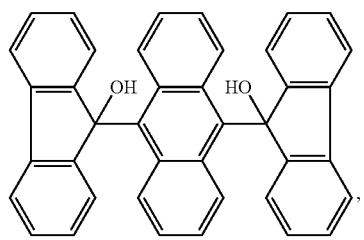
(VII)

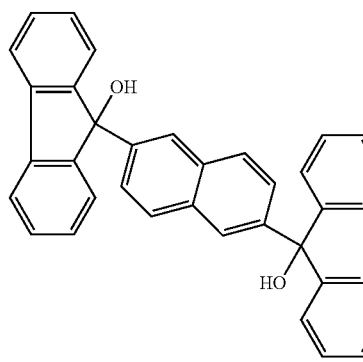
(VIII)

(IX)

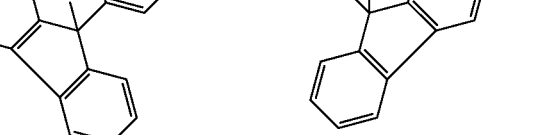

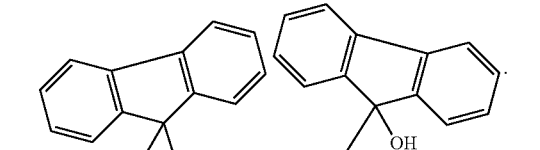

, and (X)

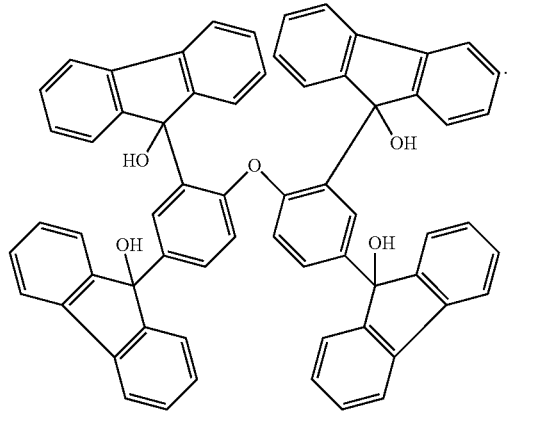

.

39. The method of preparing an elastomeric material according to claim 25, wherein the arene moiety has a molecular weight of about 1,000 g/mol to about 9,000 g/mol.

40. The method of preparing an elastomeric material according to claim 39, wherein the arene moiety has a molecular weight of about 2,000 g/mol to about 7,000 g/mol.

41. The method of preparing an elastomeric material according to claim 25, wherein the method further comprises forming a composition comprising the cross-linked organic polymer and heating the composition to form a molded article and step (c) further comprises placing the molded article in use at a temperature at or above the glass transition temperature of the cross-linked organic polymer.

42. An article formed by the method of claim 25.

43. The article according to claim 42, selected from the group consisting of an O-ring, a V-ring, a U-cup, a gasket, at least one component of a seal stack, a packer element, a diaphragm, a face seal, a bearing, a valve seat, an adapter, a wiper ring, a chevron seal back-up ring, an tubing.

* * * * *